United States Patent
Ladetto et al.

(10) Patent No.: US 7,747,409 B2
(45) Date of Patent: Jun. 29, 2010

(54) PEDESTRIAN NAVIGATION APPARATUS AND METHOD

(75) Inventors: Quentin Ladetto, Heerbrugg (CH); Koen Verhaert, Antwerp (BE)

(73) Assignee: Vectronix AG, Heerbrugg (CH)

( * ) Notice: Subject to any disclaimer, the term of this patent is extended or adjusted under 35 U.S.C. 154(b) by 637 days.

(21) Appl. No.: 10/592,080

(22) PCT Filed: Mar. 11, 2005

(86) PCT No.: PCT/EP2005/051124

§ 371 (c)(1), (2), (4) Date: May 11, 2007

(87) PCT Pub. No.: WO2005/091113

PCT Pub. Date: Sep. 29, 2005

(65) Prior Publication Data

US 2007/0260418 A1 Nov. 8, 2007

Related U.S. Application Data

(60) Provisional application No. 60/552,399, filed on Mar. 12, 2004.

(51) Int. Cl. *G06F 19/00* (2006.01)
(52) U.S. Cl. .................................................... 702/150
(58) Field of Classification Search ................ 702/150, 702/142, 143, 151, 160, 188; 342/104–107, 342/109, 113, 357.06–357.09, 357.12–357.14
See application file for complete search history.

(56) References Cited

U.S. PATENT DOCUMENTS

| 6,005,548 A | * | 12/1999 | Latypov et al. | 345/156 |
| 6,522,266 B1 | | 2/2003 | Soehren et al. | |
| 2002/0089506 A1 | | 7/2002 | Templeman | |

FOREIGN PATENT DOCUMENTS

EP 1 066 793 1/2001

OTHER PUBLICATIONS

Rawesak Tanawongsuwan et al.; Gait Recognition from Time-normalized Joint-angle Trajectories in the Walking Plane; 2001; pp. II-726-II-731.

Quentin Ladetto; "Capteurs et Algorithmes Pour La Localisation Autonome en Mode Pedestre"; SGC Publication Series; vol. 66, 2003; Zurich.

* cited by examiner

*Primary Examiner*—Edward Raymond
(74) *Attorney, Agent, or Firm*—Oliff & Berridge PLC

(57) ABSTRACT

The motion of a pedestrian is evaluated by determining at least one position of at least one identified portion of the pedestrian, projecting the positions(s) on at least one plane, and deriving the motion from the position(s) projected on the at least one plane. Typically the position(s) are determined in three-dimensions, e.g. of the feet. It is possible to project on two different planes to provide three-dimensional navigation information.

39 Claims, 33 Drawing Sheets
(22 of 33 Drawing Sheet(s) Filed in Color)

System description:

Hardware configuration

- Five I-Track sensors (green)
- One garment with harnessing (blue)
  - Processor
  - GPS receiver
  - Communication module
  - Battery pack System Architecture:

Software configuration

System software (→) to process data and generate navigation/guidance

- Measurement sequence

- Switch to "calibrate" (tactile & error proof switch operation) while line of sight (hip orientation) is kept oriented to the north during calibration

- Stand still for 10-30 s

- (optional: set forward step of 1 m and hold for 10 s + set side step of 1 m and hold for 10 s)

- Switch to "measure" -> measurement of data starts

- Automatic measurement

- Switch to "standby" -> measurement stops

- (Reset)

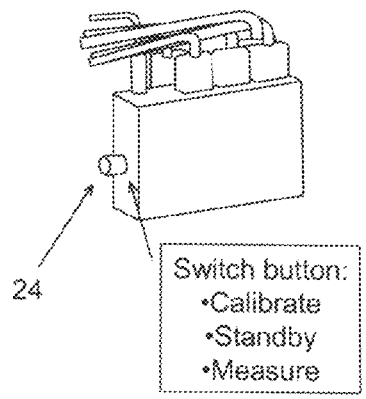

Switch button:
- Calibrate
- Standby
- Measure

Fig. 8

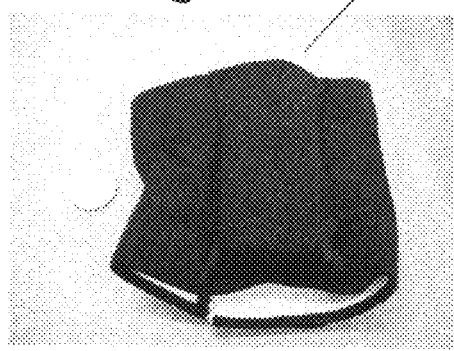

Fig. 9A

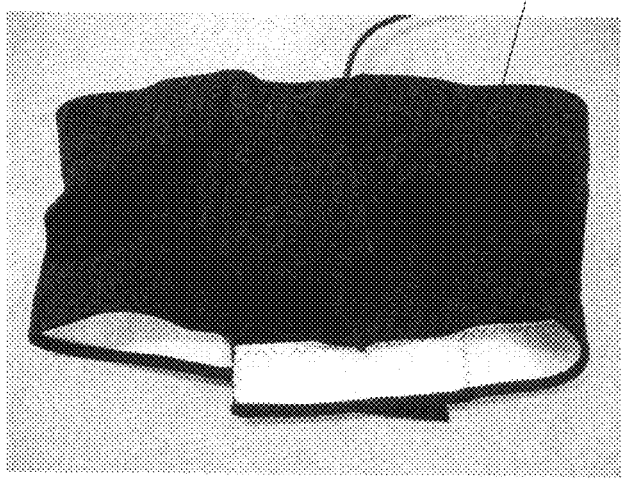

Fig. 9B

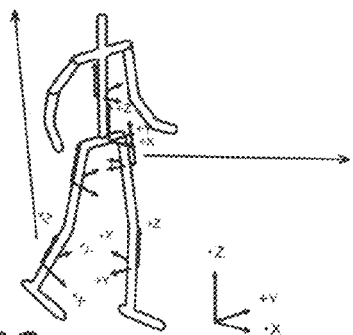

Fig. 9C

Motion detection: mathematics

- Calibration
  - Factory calibration: guarantee 90° angles between all axes and sensors
  - Field alignment to north and to vertical
- Real time
  - Data capture (quaternions) via RS232
  - Calculation of limb orientation
  - Calculation joint position
  - Step detection
  - Step orientation calculation -> output
  - Step length calculation -> output
  - Pattern recognition -> output

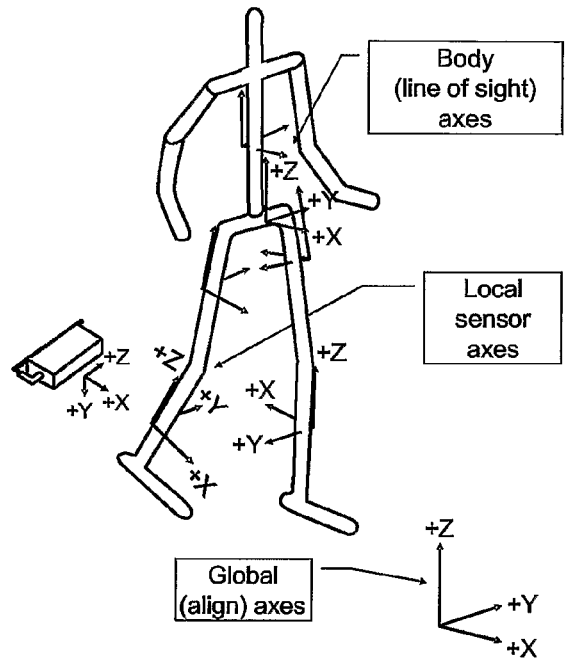

Fig. 10

PNM (alone) Artificial intelligence in pedestrian navigation

When floor-level information is of importance!

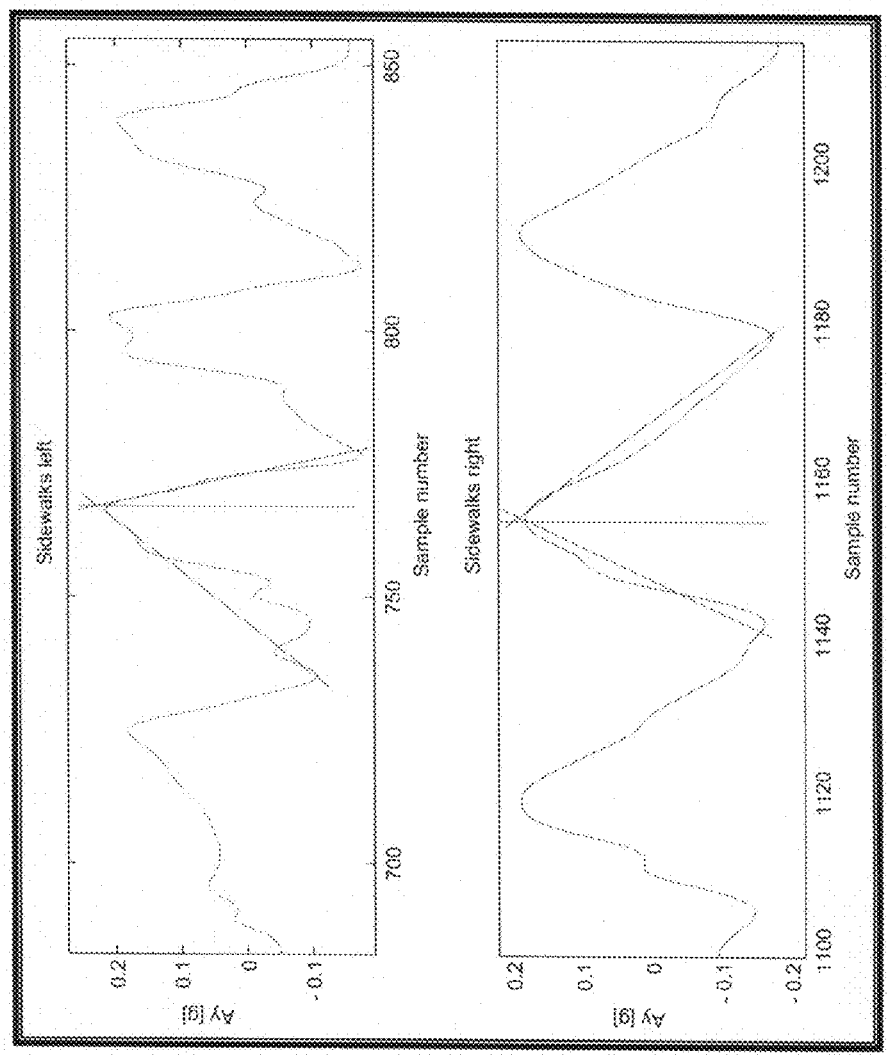

Motion in earth XZ frame at different time instants (time step of 140msec)
(right stars = left leg; green stars = back; yellow stars = right leg)

Motion in earth YZ frame at different time instants (time step of 140msec)
(right stars = left leg; green stars = back; yellow stars = right leg)

Upper figure: inclination angle for right lower (black) and upper (red) leg; lower figure: accelerometer signal (X: black, Y: red and Z: green) of right lower leg for forward walking 2 D topview of the walked square showing the measured values

PEDESTRIAN NAVIGATION APPARATUS AND METHOD

FIELD OF THE INVENTION

The present invention relates to the field of pedestrian navigation, and proposes a pedestrian navigation method and apparatus based on using wearable sensor means to determine step distance and/or orientation information which can be combined e.g. to provide relative and/or absolute 2D or 3D position.

PRIOR ART

Most known pedestrian monitoring and human motion capture systems and technologies do not provide accurate step distance or step orientation information. Accordingly, they are subject to considerable accumulated errors when operating in a dead reckoning mode with no external source of correction data.

SUMMARY OF THE INVENTION WITH OBJECTS

According to a first aspect, the invention relates to method of determining the motion of a pedestrian, comprising the steps of:
  determining at least one position of at least one identified portion of the pedestrian,
  projecting the position(s) on at least one plane, and
  deriving the motion from the position(s) projected on the at least one plane.

Optional features of the first aspect are presented below.

At least one position can be determined as a three-dimensional position of the at least one identified portion of the pedestrian.

The determining step can comprise determining the position of each foot of the pedestrian, whereby the projected positions of the feet express a distance between the feet along at least one plane.

The determining step can comprise producing a vector in three-dimensional space of a line between at least first and second body portions of the pedestrian, e.g. respective feet of the pedestrian, the projecting step comprising projecting the three-dimensional vector as a two-dimensional vector onto the plane(s).

The projecting step can comprise projecting a three-dimensional vector on at least one plane using goniometric mathematics, to produce a two-dimensional projection vector onto at least one plane.

The projecting step can comprise producing a two-dimensional vector on a plane, and projecting the two-dimensional vector to one dimension along a line corresponding to a determined direction. The latter can be a line of current azimuth of the pedestrian, or direction of general displacement of the pedestrian, or of averaged step direction.

The determining step can comprise determining the position of each foot of the pedestrian,
  the method further comprising:
  detecting a situation in which the pedestrian has completed a step, and
  performing the deriving step for a situation where the pedestrian has completed a step, thereby obtaining a step length, or extent of a step, along at least one plane.

At least one plane can be a plane containing at least one axis corresponding to an axis of a reference coordinate system on which the motion is to be expressed, or is a plane having a component along the axis of a reference coordinate system on which the motion is to be expressed.

At least one plane can comprise a ground, or horizontal, plane containing North-South and West-East axes.

At least one said plane can be a vertical plane, or a plane having a vertical component.

The projecting step can comprise projecting on two different planes the position(s) or a vector connecting positions, to provide three-dimensional navigation information.

The motion to be determined can a displacement of the pedestrian in three dimensions, the projecting step comprising projecting the position(s) on at least a first plane on which first and second dimensions of the three dimensions can be expressed, e.g. corresponding to North-South and West-East directions, and on a second plane on which the third of the three dimensions can be expressed, e.g. corresponding to a vertical direction.

The type of motion determined can be at least one of: i) a step direction and ii) a distance traveled by said pedestrian along a step direction, iii) a displacement in a two dimensional reference system, iv) a displacement in a three dimensional reference system.

Typically, the displacement is the pedestrian's motion, where the method can be used in a pedestrian navigation application to measure the traveled distance and path, so that the pedestrian or an entity tracking the pedestrian can determine his/her position, e.g. against a map or a given coordinate reference system.

The method can be typically implemented in real time, or close to real time, so that the navigation information relates substantially to the instant position of the pedestrian.

As shall be understood from the description, the method is amenable to detect and provide displacement information for various types of motions made by the pedestrian, such as: normal walking on various ground situations, crab walking (making side steps), walking in a crouching position, running, climbing up stairs, etc.

The method can comprise determining the type of motion made by the pedestrian (e.g. walking, running, side-stepping, stepping at an angle, etc.) on the basis of detected body positions, and of using that information in the displacement determination.

The method can further comprise:
  determining a line of azimuth of the pedestrian, or line of average direction of steps made by the pedestrian,
  deriving, from the determining and projecting steps, individual step vectors, and
  projecting the individual step vectors on the line of azimuth or of average direction.

At least one position of at least one identified portion of the pedestrian can be determined by sensor means worn by the pedestrian and adapted to deliver data in respect of at least one of:
  quaternion calculation,
  calculation of limb orientation;
  calculation of joint position;
  step detection;
  step orientation calculation;
  step length calculation;
  pattern recognition.

Data for the determining step can be acquired by sensor means worn by the pedestrian on:
  upper leg portions of each leg,
  lower leg portions of each leg, and
  optionally, a lower back, waist, or trunk portion.

The determining step can comprise determining relative positions of identified upper and lower leg positions for each leg of said pedestrian.

The determining step can comprise determining a distance between two lower leg portions and/or two feet of the pedestrian.

The determining step can comprise determining an identified position at a lower back, waist or trunk portion of said pedestrian.

The method can further comprise establishing a situation in which the pedestrian has completed a step movement on the basis of at least one criterion among:
 a measurement of the three-dimensional position of each foot of the pedestrian,
 a measurement of distance between feet of the pedestrian,
 detection of a situation in which at least one foot of said pedestrian is in a state of no acceleration,
 shock measurements,
 and of carrying out the projecting step and/or the deriving step as a function of establishing a completed step movement.

The method can further comprise establishing a situation in which the pedestrian has completed a step movement on the basis of a separation between two feet of said pedestrian, by:
 determining a substantially vertical component of the separation,
 the occurrence or crossing of a substantially zero value of the substantially vertical component,
 and of carrying out the projecting step and/or the deriving step as a function of establishing a completed step movement.

The method can further comprise establishing a situation in which the pedestrian has completed a step movement on the basis of the point of maximum horizontal distance between the feet of the pedestrian, by:
 obtaining a distance measurement between the two feet, and
 identifying a completed step movement as the occurrence of a maximum value in said distance measurement, and
 of carrying out the projecting step and/or the deriving step as a function of establishing a completed step movement.

The method can comprise the step implementing an autonomous human motion pattern recognition algorithm, with a database of minimum and maximum values for at least one parameter used in the pattern and/or a model used in conjunction with the pattern.

The method can comprise the step of implementing a minimal trimmed three-dimensional ergonomic model containing at least one critical parameter based on three-dimensional joint positions and limb orientation.

The method can comprise the step of using a pattern recognition algorithm and of applying weighting coefficients per pattern on identified parameters based on at least one dynamic characteristic and/or at least one boundary condition of human motion patterns, whereby a score for each pattern is calculated per step made by the pedestrian, the highest score being used as the pattern to select for the algorithm.

The method can further comprise a calibration phase for sensor means or sensor signal processing means carried by the pedestrian, comprising providing positional references by:
 having the pedestrian oriented at a determined azimuth, preferably North,
 having the pedestrian standing still in that orientation for a determined period of time,
 optionally having the pedestrian make at least one forward step and holding the new position for a determined period of time, making at least one side step holding the new position for a determined period of time, The method can comprise the step of equipping the pedestrian with a set of sensors at selected body portions, each sensor being capable of delivering a respective quaternion, said method further comprising the steps of:
 converting said quaternions into a rotation matrix,
 calculating a sensor alignment matrix,
 deriving at least one of:
  pattern recognition,
  a step distance,
  orientation,
 on the basis of the rotation matrix and/or the sensor alignment matrix.

The method can comprise deriving real navigation azimuth of the pedestrian, by:
 placing first sensor means on the pedestrian, preferably on the back substantially at hip level, to derive an absolute orientation, or a line of sight, azimuth of the pedestrian, e.g. the pedestrian's facing direction relative to North or an external reference direction;
 placing a plurality of second sensor means on selected body portions to determine relative azimuth of the body portions, and
 combining the data from the first and second sensor means to produce a real navigation azimuth.

Data from said second sensor means can be used to determine a step direction of said pedestrian, the combining step comprising adding the determined step direction to the orientation, or line of sight azimuth to obtain a real navigation azimuth along the step direction.

The determined motion can comprises pedestrian navigation information based step length data, and the method can further comprising the steps of:
 operating an autonomous pedestrian navigation apparatus functioning by dead reckoning, the autonomous pedestrian navigation apparatus being worn by the pedestrian and being capable of delivering displacement information, notably distance traveled and/or trajectory,
 using sensor means worn by the pedestrian to determine from body positions a detected step length data,
 providing the step length data as input to the autonomous pedestrian navigation,
 optimizing the accuracy of the displacement information of the autonomous pedestrian navigation apparatus on the basis of the inputted detected step length.

The method can further comprise the steps of:
 deriving from sensor means relative azimuth data (relative to a determined orientation or line of sight of said pedestrian), and
 providing the relative azimuth data as data input to the autonomous pedestrian navigation apparatus.

The autonomous pedestrian navigation apparatus can be provided with internal means for determining step length on the basis of step model data and algorithms, and the step length data from the sensor means can be used by the autonomous pedestrian navigation apparatus instead of relying on those internal means of the autonomous pedestrian navigation apparatus for determining step length.

According to another aspect, there is provided a method of determining the motion of a pedestrian, comprising the steps of:
 determining a relative separation between identified body portions of the pedestrian, and
 deriving from the relative separation a projection on at least one plane over which said pedestrian evolves or over a plane having a component along a direction over which said pedestrian evolves.

According to another aspect, the invention provides an apparatus for determining the motion of a pedestrian, comprising:
    means for determining at least one position of at least one identified portion of the pedestrian,
    means for projecting the position(s) on at least one plane, and
    means for deriving the motion from the position(s) projected on the at least one plane.

The apparatus can be adapted to implement the method according to the preceding aspects. The optional features of the method presented in respect of the first aspect are applicable mutatis mutandis to the apparatus.

According to yet another aspect, the invention relates to a computer program, or a carrier containing program code, the program or the program code being executable by processor means to perform the method according to first aspect and/or any of the optional features of that first aspect.

In one aspect, there is provided an apparatus for determining the motion of a pedestrian, comprising:
    means for determining a relative separation between identified body portions of the pedestrian, and
    means for converting the relative separation as a projection on a ground plane over which the a pedestrian evolves.

The apparatus can be based on a pedestrian navigation module (PNM) alone to detect and analyze pedestrian motion.

It can also be based on a motion detection system having at least one inertial measurement unit (IMU), that motion detection system alone serving to detect and analyze pedestrian motion.

It can also be based on a pedestrian navigation module (PNM) and on a system having at least one inertial measurement unit (IMU), both cooperating to detect and analyze pedestrian motion.

BRIEF DESCRIPTION OF THE FIGURES

The patent application file contains at least one drawing executed in color.

The invention and its advantages shall be more clearly understood from reading the following description of the preferred embodiments, given purely as a non limiting example, with reference to the appended drawings in which:

FIG. 8 is a general view of the processing with indications of a measurement sequence through the use of a pushbutton;

FIG. 9A is a general view of a garment for containing a sensor to be worn on the lower leg portion of a pedestrian;

FIG. 9B is a general view of a garment for containing a sensor to be worn on the upper leg portion of a pedestrian;

FIG. 9C is a schematic representation of a pedestrian with indications of where the garments of FIGS. 9A and 9B are worn;

FIG. 10 is a schematic diagram of a pedestrian and the associated sensor and processing units, together with an outline of the motion detection mathematics used in the preferred embodiments of invention;

FIG. 19 shows two plots of accelerometer signals during antero-posterior displacement movements of a pedestrian, obtained by a personal pedestrian navigation module alone;

DETAILED DESCRIPTION OF THE PREFERRED EMBODIMENTS

Figure 1:
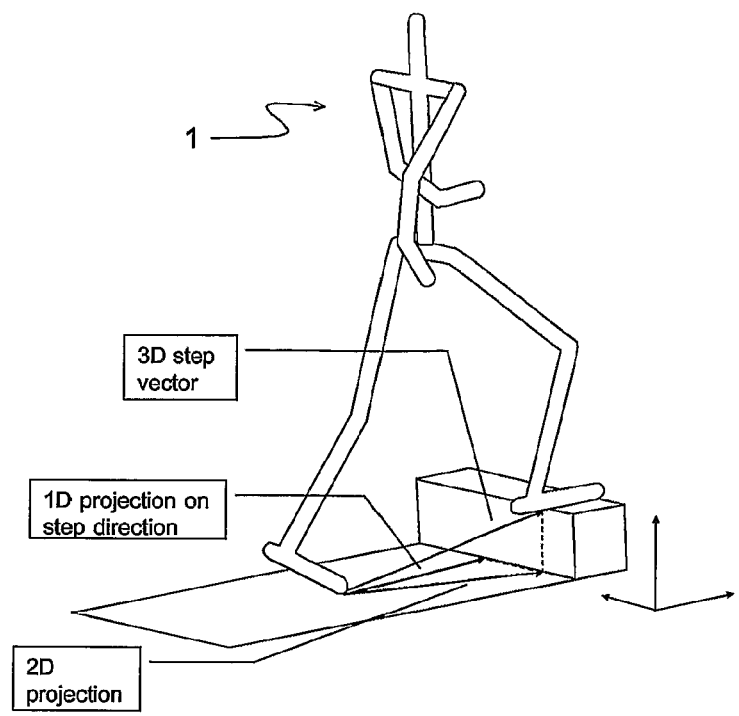
FIG. 1 is a schematic the presentation of a pedestrian walking up a step, showing how a three-dimensional step vector corresponding to the line joining two feet of the pedestrian is projected on a two dimensional plane and on a one dimensional line.

Outline of the General Features of the Preferred Embodiment

In this section, the general features of the preferred embodiments are briefly presented in terms of how they contrast with other known techniques used in the field. The technique used in the preferred embodiments is based on step distance measurement of a human pedestrian.

The preferred embodiment provides a methodology and technology to calculate accurately step distance and step orientation information, starting from 3D position information of feet measured by human motion capture systems based e.g. on optical, mechanical, inertial, acoustic, magnetic sensors, etc.

This approach is implemented on the basis of three concepts:

1) translation—i.e. mapping—of a three-dimensional (3D) distance between two feet into a distance established on a two-dimensional (2D) plane. The position and/or orientation of that 2D plane can depend on applications and/or on the movements to be made.

2) identifying when a step has been made, and 3) calculating a step direction and distance relative to/along the calculated step direction. Each concept gives rise to a method presented below.

1) Method of Translating a 3D Distance Between Two Feet into a Distance on a 2D Plane, Typically a Horizontal Plane or Ground Plane.

Known human motion capture systems such as optical, magnetic, inertial, and mechanical systems are capable of delivering, directly or indirectly, the distance between two feet.

This information is to be determined by identifing in 3D the respective positions of both feet in X, Y, Z coordinates. However, as most mapping and navigation applications are based on two-dimensional (2D) information systems, there is therefore a need for establishing feet inter-distance with respect to the appropriate plane.

Some known systems start from the assumption that if both feet touch solid ground, they are probably standing on the ground and are therefore on the horizontal plane. Although in some applications sufficient, this known approach creates important errors when the subject is walking on stairs or walking on sloping surfaces.

The preferred embodiments solve this problem by implementing a methodology which starts by determining the 3D position (X, Y, Z) of each of both feet, and produces a vector expressing the distance in three-dimensional space between both feet. This 3D vector thus expresses the 3D distance between the feet and the orientation of the line along which that distance is expressed, i.e. the line connecting both feet at respective determined foot reference points.

The 3D vector is advantageously projected on a 2D surface (X, Y) using goniometric mathematics, resulting in a 2D projection of both feet on the plane considered. Then, the 2D projection is itself projected along a line identified as the line of general, or average, displacement of the pedestrian, where it constitutes a 1D projection, or a component of distance travelled along that line for the step considered. This line can be assimilated to the "line of sight" of the pedestrian.

The concept used is illustrated in FIG. 1, which shows a pedestrian 1 in a stick-like schematic representation walking over a step. The 3D step vector is a line connecting both feet at predetermined reference points thereof. From that vector is derived a 2D projection on the plane considered, which is here the ground plane. In this particular case, the ground plane happens to be the portion of ground in front of the step. Also shown is a one dimensional (1D) projection of the 3D vector on the aforementioned line of general step displacement.

Note that it is not necessary to derive the 3D vector for the spatial separation distance between the feet. Indeed, it is also possible to project just the positions in 3D space of the feet (each position is typically an identified point at the foot). When projected on the 2D projection plane considered, these 3D positions (points) for each foot give rise to two corresponding points on that plane. These two corresponding points can then be connected to form the 2D projection as before. In other words, instead of constructing a 3D vector and projecting it to produce directly a 2D vector on the plane, the same 2D vector is constructed on the plane from initial projected points.

Figure 2:
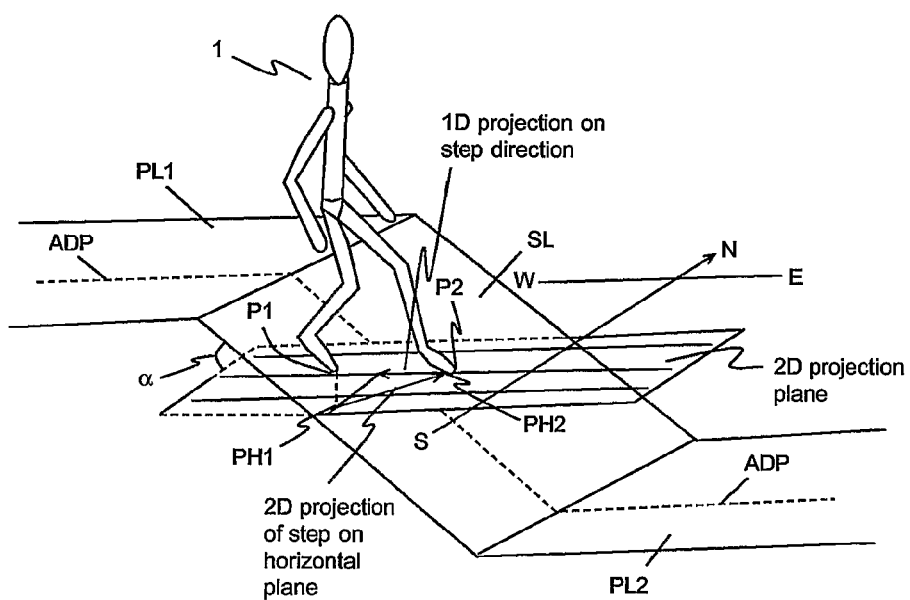
FIG. 2 is a representation in perspective of a pedestrian walling down a slope, showing how the positions of his/her two feet are projected on a horizontal two-dimensional plane, and how that projection is itself projected in one dimension on a line of step direction.

FIG. 2 illustrates another example of how the step direction is derived, this time for a pedestrian 1 walking down steep slope SL, at an inclination α to the horizontal, connecting two planar regions PL1 (top) and PL2 (bottom). Along this the steep slope, the pedestrian's step has a significant lateral component. In other words, the advancing foot at the end of the step has a significant lateral shift with respect to the plane containing the pedestrian's centre (spinal) axis. Likewise, the backmost foot is laterally shifted with respect to that axis.

In the example, the movement of the pedestrian is to be determined along a coordinate system mapped against a 2D reference plane. Typically, the reference plane is horizontal (ignoring the Earth's curvature), to contain the cardinal point axes North-South and West-East. In this case, the 2D projection plane, over which the 3D foot positions are projected, is the ground plane, parallel to (or on) that reference plane. The 3D positions P1 and P2 of the respective foot references are projected on that horizontal plane, advantageously by goniometric mathematics, producing two projection points PH1 and PH2. The projection points correspond to 2D positions on that plane directly beneath the reference points of the pedestrian's two respective feet. The vector of the 2D projection (referred to as the 2D step projection vector) on that horizontal plane is the line on that plane joining these two points PH1 and PH2.

Figure 4:
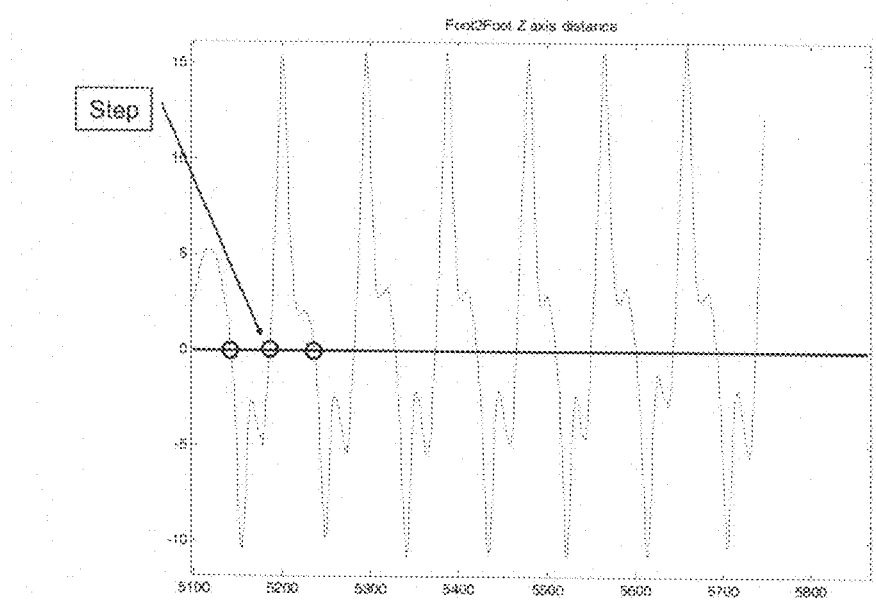
FIG. 4 is a plot showing the foot-to-foot distance of a pedestrian along a vertical axis to determine a step motion in accordance with an embodiment of invention.

Because of the lateral shift of the feet, the orientation of this 2D projection is correspondingly off-axis with respect to the average step displacement path ADP of the pedestrian, i.e. the actual path of the pedestrian considered for a succession of steps, here along a substantially straight line. This aspect is discussed more particularly with reference to FIG. 4.

In order to obtain the component of the 2D step projection vector along this average step direction path, the embodiment makes a projection of the 2D step projection vector on that line average step direction path. The result of that projection is thus a 1D projection along the step direction. For successive steps, the corresponding 1D projections thus derived are accumulated to produce a total distance from a given start point along the line of average step direction.

The azimuth of the average step direction path is determined by azimuth determination techniques implemented by the sensor hardware and software carried by the pedestrian, as explained further.

Figure 32:
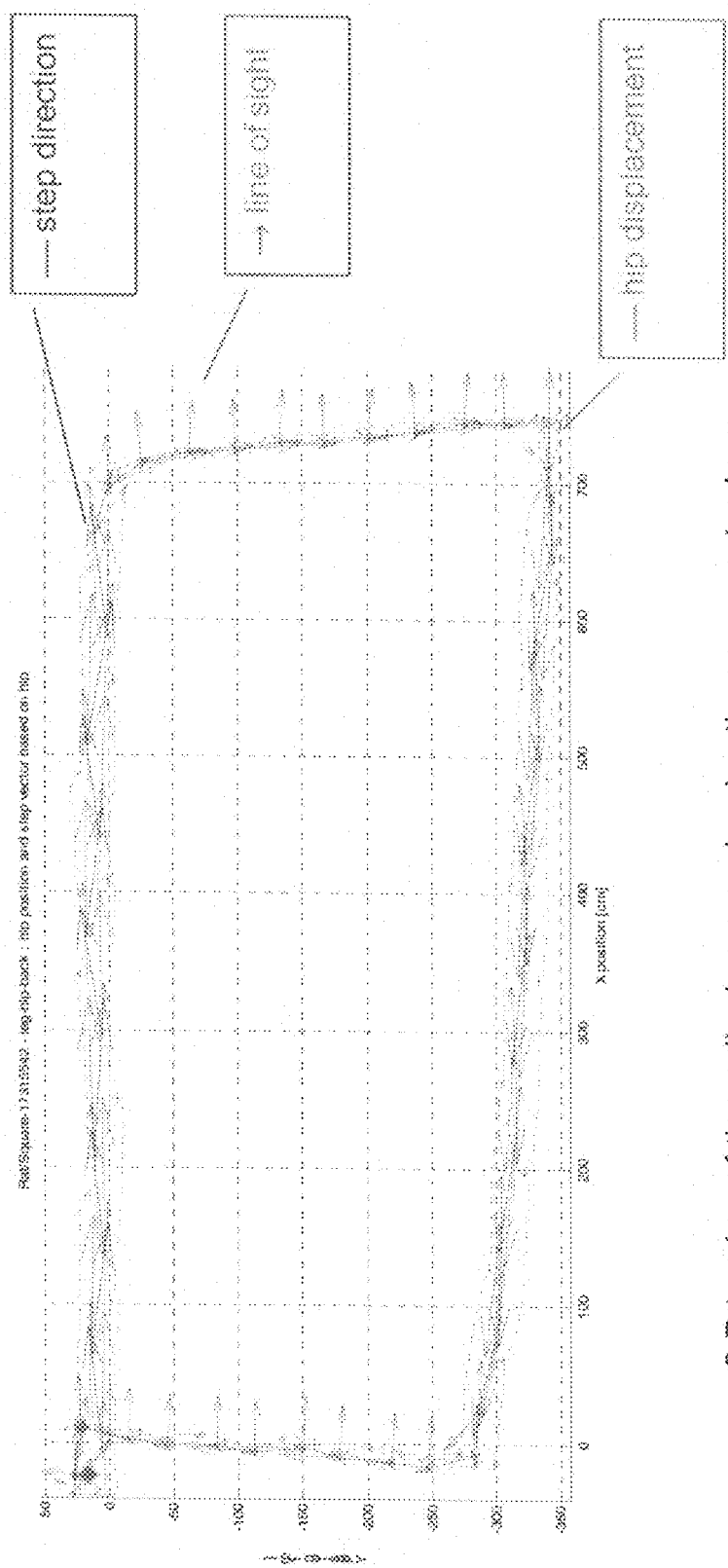
FIG. 32 is a two-dimensional plan view of the charted step directions, line of sight and hip displacement of a pedestrian walking round a rectangular path, obtained by an embodiment of the invention.

In this way, the embodiment determines both the distance travelled and the overall path in the pedestrian's displacement (cf. FIG. 32, for instance).

In some applications, the change of elevation may not be of interest, e.g. in a street navigation application where it is simply required to know the pedestrian's displacement with respect to North-South and East-West axes. In this case, all the information required to determine the displacement of the pedestrian is contained in the step direction vector on the 2D plane considered (e.g. in terms of the orthogonal x and y components using Cartesian coordinates corresponding to North and East directions). The vertical position of that plane is arbitrary, and can be suited to the projection mathematics used. For instance, its elevation can be made to coincide systematically at each step with the left or right foot contact plane, or with the plane of contact of the advancing or rearmost foot, etc.

It shall be appreciated identification of 3D foot positions, even in the case where elevation information is not required, contributes to obtaining good 2D positioning accuracy: the projections make the appropriate distinction between the actual step length along the ground (i.e. length along the slope SL) and component of that step along the plane of interest. In this way, accuracy is kept even if the pedestrian is evolving over hilly terrain, steps, inclines of various sorts, etc.

Note that the 2D projection plane could conceivably be inclined with respect to the horizontal, e.g. if this can simplify the calculation or processing. The end result is then submitted to a final correction by a trigonometric scaling factor to produce a result in terms of an established reference coordinate system, e.g. on ground plane.

There shall now be described how the embodiment can take elevation information into account. Such information can be of interest, e.g. to determine the amount of vertical displacement in a path followed by the pedestrian. Depending on applications embodiments can be implemented:
- to determine a total 3D displacement of the pedestrian, or
- to determine just the elevation information, for instance if it is simply desired to know on which floor of a building a pedestrian is situated.

As explained with reference to FIGS. 3A, 3B and 3C, the approach for determining a vertical projection component of a step is analogous to that for determining the step projection on the plane as described with reference to FIG. 2.

Figure 3A:
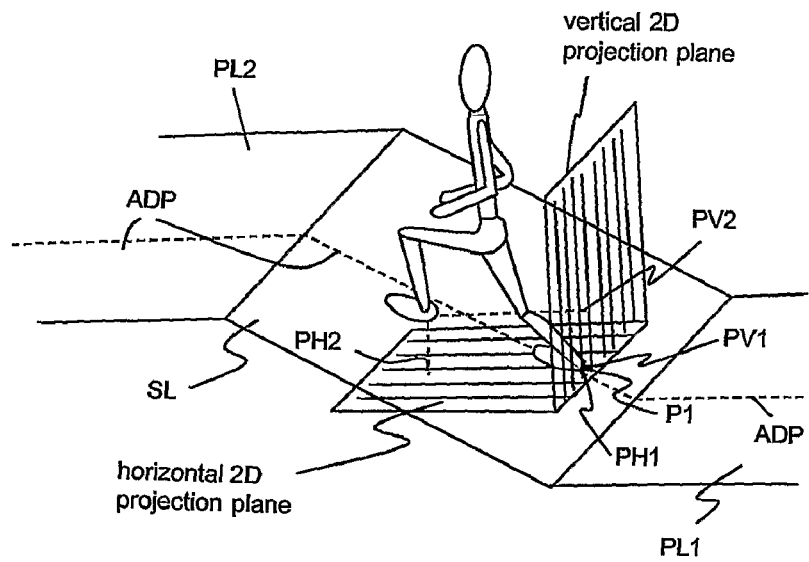
FIG. 3A is a representation in perspective of a pedestrian walking up a slope, showing how the positions of his/her two feet are projected on a horizontal plane as for FIG. 2, and on a vertical plane, to determine a displacement of that pedestrian in three dimensions.
Figure 3B:
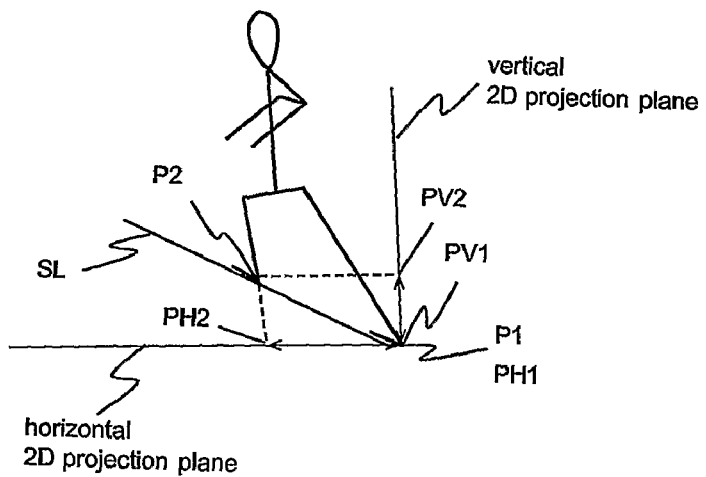
FIG. 3B is schematic side view derived from FIG. 3A, showing projections of the pedestrian's foot positions on the horizontal and vertical planes giving rise to respective two-dimensional step vectors.

In the example of FIG. 3A, the pedestrian is walking up the slope of FIG. 2. Here, two 2D projection planes are defined: a horizontal 2D projection plane, as in FIG. 2, and a vertical 2D projection plane. In this example, both planes are arranged arbitrarily to intersect at the position of the backmost foot of the pedestrian. The 3D position of each foot is determined as before. Each 3D foot position P1 and P2 is projected on each of the horizontal and vertical planes.

The projections of the 3D foot positions on the horizontal plane are designated PH1 and PH2, as before, and the projections of the 3D foot positions on the vertical plane are designated PV1 and PV2. The mappings of these points PH1, PH2, PV1, PV2 are shown diagrammatically in FIG. 3B.

Figure 3C:
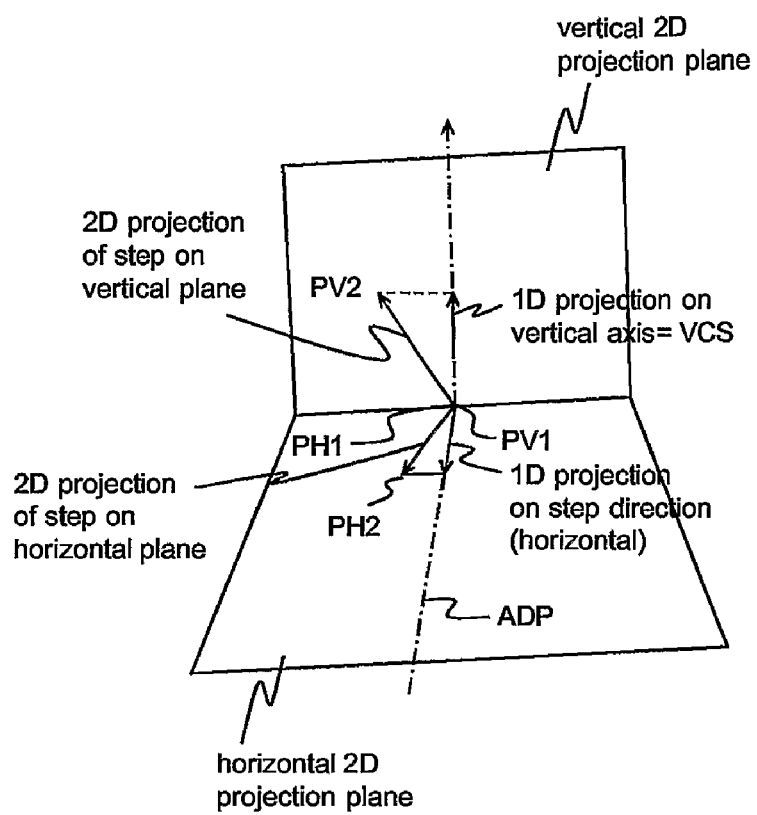
FIG. 3C is a schematic front view showing the two-dimensional step vectors, in the horizontal plane projected in one dimension along a general step (pedestrian movement) direction, and the two-dimensional step vector on the vertical plane projected on a vertical axis to indicate the pedestrian's vertical evolution.

As shown in FIG. 3C, for the horizontal plane, the 2D step projection vector corresponds to the line joining the projected points PH1 and PH2.

For the vertical plane, the 2D step projection vector is similarly the line joining the projection points PV1 and PV2.

Typically, in a 3D navigation application, the horizontal plane would be in a plane containing the North-South and West-East axes, as mentioned above with reference to FIG. 2. As step direction is mapped in two dimensions on that plane, the vertical plane need only serve to record the vertical component of the step, designated VCS. This is illustrated on the vertical plane of FIG. 3C, where the vertical plane step projection vector is inclined with respect to the vertical, on account of the lateral shift of foot positions. The algorithm in this case derives the vertical component VCS and accumulates the successive VCS values for respective successive steps, taking the sign into account (e.g. +ve for an upward displacement, −ve for a downward displacement, along the vertical axis). In this way, the net vertical displacement is obtained from the cumulated VCS values to provide the vertical component (z component in a Cartesian coordinate system) of the pedestrian's displacement, while the two other orthogonal components (x and y components, e.g. corresponding to North and East bearings) are determined on the horizontal plane, as for the example of FIG. 2.

In this way, by considering two projection planes, it is possible to obtain the pedestrian's 3D displacement, e.g. distance travelled with respect to North and East bearings and altitude (or change of altitude from an initial point).

As for the possible variant explained with reference to FIG. 2, the horizontal plane shown in FIGS. 3A-3A may be inclined with respect to the horizontal, e.g. to simplify the projection calculations, refer to the alignment of a sensor, or to establish a specific chosen reference plane on which to define a displacement. Similarly, the vertical plane shown in FIGS. 3a-3c may also or instead be inclined with respect to the vertical, for similar reasons.

The information thus obtained, whether expressing 2D or 3D displacement, can be used for navigation against a map, e.g. a digital map stored in an electronic memory. The map can be reproduced on a display with an indication of the pedestrian's position.

The information can be produced and exploited substantially in real time.

2) Method of Identifying when a Step is Made.

Known human motion capture systems such as optical, magnetic, inertial, and mechanical systems are potentially capable of delivering the 3D position of both feet, and therefore foot interdistance at a certain time. What they fail to provide, however, is a reliable method to identify when a step is finished, meaning the moment when the step distance is to be determined.

Prior art techniques to identify this critical moment are based on accelerometers measuring the impact at the moment when a foot touches the ground.

Although adequate for some applications, especially in sports, this approach is insufficient to detect accurately steps in different walking patterns.

The solution according the preferred embodiment is based on a combination of at least one of the following parameters: a) 3D measurement of foot positions, b) distance measurement between feet, c) a point of no acceleration, and d) known shock measurement techniques.

Both parameters c) and d) above are measured with accelerometers.

Those of parameters a)-d) used are processed by an algorithm that takes into account boundary conditions of human motion analysis and ergonomics and weighing factors to combine those parameters.

a) 3D Measurement of Foot Positions.

The 3D position of both feet, especially Z (vertical) coordinates, are permanently measured with available human motion capture technologies e.g. optical, magnetic, mechanic, inertial sensors, etc.

The procedure analyses the difference between those Z coordinate values, taking an arbitrary foot as the point of reference. In this way, the difference can take positive and negative values as a function of whether the other foot is respectively above or below the reference foot.

A step is identified as being completed in a situation where the aforementioned difference between Z coordinate values changes sign in the periodic foot movement.

This identification criterion is illustrated by the plot of FIG. 2, which shows foot-to-foot distance in cm along the Z (vertical) direction (i.e. the difference in the Z coordinate values of the feet) as the ordinate and time as the abscissa. As explained above, this difference is measured using a chosen particular foot as the reference, whereby that distance can take negative values when that foot is above the other. The points where the foot-to-foot distance changes sign (zero difference in Z coordinate values), i.e. where one foot evolves from being above/below to below/above the other, are shown encircled, each correspond to a step period identification.

b) Distance Measurement Between Feet.

By taking into account normal walking patterns, one can assume that both feet touch the ground, and therefore a step has been made, at the moment when the horizontal distance between both feet is maximal.

c) No Acceleration Condition.

When both feet are placed on the ground, e.g. at the moment of a step, they will not accelerate unless they are placed on an accelerating object.

d) Identified Shock Measurement Technique.

When the feet hit the ground a shock can be measured and thus a step can be detected on that basis. Table I below summarises preferred step detection criteria (step detection method) as a function of walking pattern (type). In the table, the symbol "+" indicates the preferred step detection method, while the symbol "v" indicates a possible, but not the preferred, step detection method. The symbol "−" indicates that the corresponding step detection method is not practical.

TABLE I

Preferred step detection criteria (step detection method) as a function of walking pattern (type)

| walking pattern | similar height of both feet | maximum in horizontal distance between feet | maximum in 3D distance between feet | no acceleration of feet | shock detection (on feet, legs or back) |
|---|---|---|---|---|---|
| normal walking in a horizontal plane (forward, backward, sidewards) | v | + | v | v | v |
| special walking in a horizontal plane (crouching, crab) | v | + | v | v | v |
| (running in a horizontal plane | − | + | v | − | + |
| climbing patterns: walking on slopes, stairs, . . . | − | − | + | v | v |

3) Method of Calculating Step Direction and Distance Relative to Direction.

The direction of walking is advantageously determined kinematically by the average direction of successive movements of right and left feet, and not by the direction of independent steps. For navigation purposes, the preferred embodiment defines step distance in function of this average direction of consecutive steps, this being the real walking direction.

As understood from the description with reference to FIGS. 1-3C, the developed methodology calculates mathematically the line of average direction of consecutive steps for one stride, i.e. two steps as a minimum and projects the measured distance of separate steps on this line, i.e. establishes the component of the separate steps along that line of average direction. This value can be calculated relative to the absolute North or relative to the body orientation.

Figure 5:
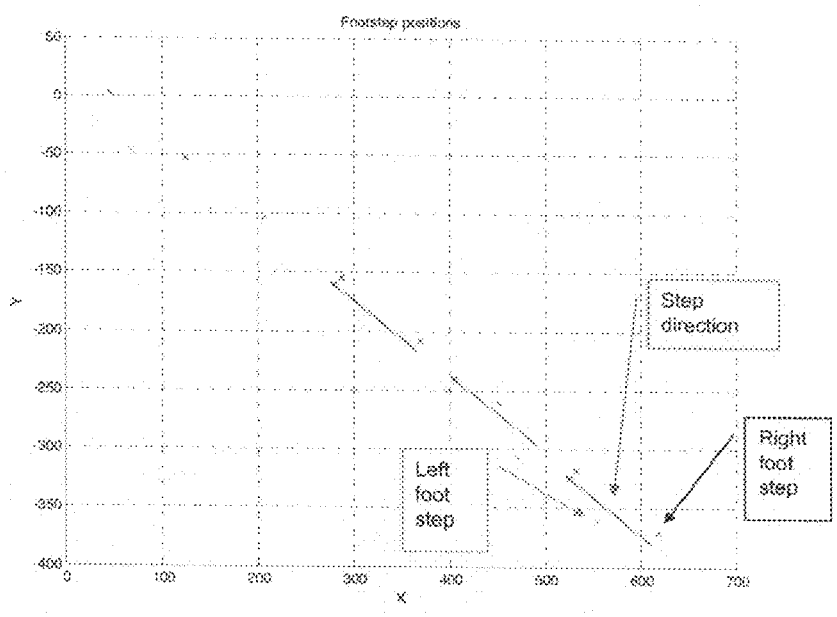
FIG. 5 is a plot showing footstep positions with indications of a step direction and left and right foot positions along that direction.

FIG. 5 is a graph illustrating how this approach is used to determine a step direction from the positions of the left and right feet. The abscissa and ordinate axes correspond to Y and X spatial coordinates.

Method for Autonomous Human Motion Pattern Recognition.

Although some available human motion capture systems and technologies provide information for human motion pattern recognition, none of them is capable of identifying these patterns autonomously and in the field.

For instance, optical systems provide full 3D visual information and 3D coordinates for pattern recognition, but need operators or high-end, hardware-demanding, optical pattern recognition software. The specifications of the hardware to run such a software are not compatible with the requirements of in-the-field, autonomous systems. In addition to this hardware limitation, optical systems have other constraints for autonomous field applications, like being limited to line of sight communication and being vulnerable to optical disturbance.

The methodology and software used in the preferred embodiments overcome at least some of the shortcomings discussed above and are generally based on three elements:

1) Minimal trimmed 3D ergonomic model containing—but limited to—critical parameters, based on 3D joint positions and limb orientation.

2) Database of minimum and maximum values for some, and preferably for all, parameters in the different patterns.

3) Weight coefficients per pattern on the identified parameters based on dynamic characteristics and boundary conditions of human motion patterns.

Based on the above elements, a score for each pattern is calculated per step, the highest score giving the actual pattern.

Table II below gives some examples of some typical parameters and their limit values for some step patterns.

TABLE II

Examples of some typical parameters and their limit values for forward, side-right, crouching and upward stair climbing step patterns

| | Parameter range (min-max) | | | |
|---|---|---|---|---|
| | angle (degs) between line of sight and step direction | step height difference (cm) | back inclination (degs) | angle (degs) between upper & lower leg |
| Forward | −12-12 | 0-10 | 0-10 | 10-55 |
| Side right | 70-110 | 0-10 | 0-10 | 0-30 |
| crouching | −20-20 | 0-10 | 15-50 | 30-120 |
| Stairs up | −20-20 | 10-50 | −5-10 | 20-70 |

Thus, by providing sensors at appropriate body portions, it is possible by the above techniques to derive a step distance value.

Detailed Description of the Pedestrian Navigation System According to a Preferred Embodiment.

Figure 6A:
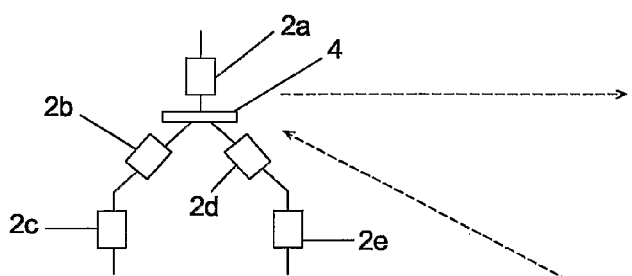
FIG. 6A is a schematic representation of a pedestrian wearing a set of five sensors covering the upper and lower leg portions and the back of the waist or trunk, at hip level, in accordance with the preferred embodiments of the invention.
Figure 6B:
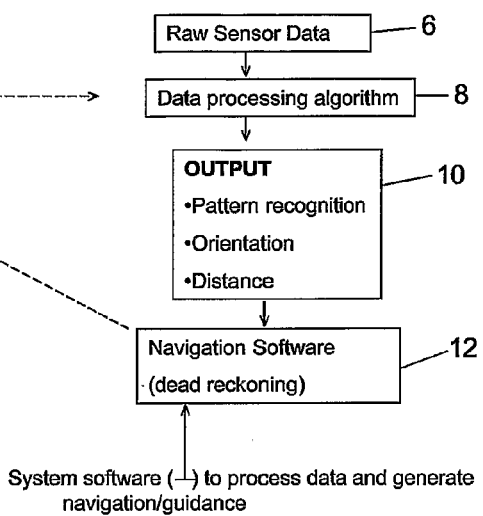
FIG. 6B is a schematic diagram showing the software configuration and data flow of the preferred embodiments of invention.

The general architecture of the pedestrian navigation module is shown in simplified form in FIGS. 6A and 6B, which respectively show the hardware configuration and the software configuration.

The hardware configuration (FIG. 6A) is based on five wearable sensor modules 2a-2e (also referred to as "sensors", or inertial measurement unit (IMU) sensors and generically designated by reference numeral 2).

These sensors are worn respectively at: the back of the waist, preferably aligned with the spine and at hip level, left and right thighs (upper leg portions), and left and right lower leg portions. The hardware also includes a garment for those five sensors, with harnessing 4 which includes a processor, a communications module, and a battery pack.

Further details in connection with these wearable sensors and the garments in which they can be integrated are described in Belgian patent application published under BE-A-101 46 43 filed on 14 Feb. 2002 to Verhaert Production Services, and whose entire contents are herein incorporated by reference.

In a first variant, the sensor 2a worn at the back of the waist is replaced by a personal navigation module (PNM) described in U.S. Pat. No. 6,826,477, issued on Nov. 30, 2004, inventor Quentin Ladetto et al. The entire contents of that application are herein incorporated by reference. In that variant, the other four sensors 2b-2e are kept as they are. The PNM and these four leg-mounted sensors 2b-2e operate in concert, as explained further.

As explained in U.S. Pat. No. 6,826,477, the PNM constitutes a self-contained dead reckoning mode pedestrian navigation apparatus. It determines the displacement of a pedestrian by detecting accelerations having at least one component that is substantially non-vertical, typically along the antero-posterior (forward-backward) direction, determining at least one characteristic feature of the detected accelerations correlated with a displacement step motion, and determining the displacement on the basis of that feature, the determined displacement typically being from a previous point to a predicted point.

The characteristic feature can be a maximum or minimum acceleration value in a determined group of detected acceleration values acquired in a time window.

To determine navigation information, the PNM 15 is normally provided in a memory with one or several step models and algorithms to implement those models. In this way, a detected step displacement of the pedestrian can be analysed using the model(s) to determine step length and/or step speed.

This enables the PNM to operate as an autonomous pedestrian navigation system, if needs be.

In a second variant, the above personal navigation module (PNM) is implemented in addition to the five sensors 2a-2e, whereupon the pedestrian is equipped with six sensors in total, operating in concert. The PNM and the IMU sensor 2a worn on the back can in this case be adhered one against the other, typically with the IMU sensor 2a adhered onto the PNM module.

Thus, depending on embodiments, the system can be composed—as regards sensor units—of just the IMU sensors 2, some or all of the IMU sensors with the PNM. Also, the PNM is equipped with its own digital compass and gyroscope to provide azimuth data, and can thus be used on its own.

As shall be more apparent from the teachings, the combination of the IMU sensor system 2 and the PNM provides an optimisation of performance.

In an implementation where the IMU sensor system and PNM work together, the respective roles can be as follows:
- the PNM provides absolute positioning information (higher end sensors),
- the IMU sensors 2 provide data in respect of relative motions of body portions, typically motion relative to the PNM;
- the intelligence (processors) associated with the IMU sensors 2 feeds to the PNM: relative azimuth (typically relative to a line of sight), step distance, motion type (detected walking pattern);
- the PNM adds the relative azimuth to the navigation azimuth to enable to produce a real azimuth of the walking motion. For instance, if the pedestrian is facing North (which is e.g. identified as Azimuth=0° in the PNM), and is side-stepping to the right, then the relative azimuth is 90°. Thus, the navigation azimuth is determined to be 0°+90°=90° in this example. This azimuth information is combined with the step distance to produce the distance and direction navigation information. The procedure is iterated at each next position and step, so as to obtain cumulated navigation information.

When the PNM operates without the IMU sensor system, as in the aforementioned US patent, it relies on its onboard step model(s) and step algorithms to derive step length. When operating in conjunction with the IMU sensor system, the step length is provided directly by the latter, and thus there is no reliance on step modelling. This can give an improvement in accuracy as regards the determination of distance travelled.

The IMU sensor system is also amenable to deliver information on many different types of walking modes, in addition to the forward/backward, left/right side stepping detected by the PNM.

In one form, each IMU sensor 2 comprises a housing in which are installed a number of micro-sensor elements. These comprise:
- three gyroscopes which measure absolute angular velocity in three mutually perpendicular directions,
- three magnetometers which measure the Earth's magnetism and together form an electronic compass for measuring the sensor's azimuth, and more specifically the azimuth of a fixed reference direction of the sensor, and
- two accelerometers which measure the sensor's acceleration in the above-mentioned three perpendicular directions, and which together form an electronic spirit level for measuring the sensor's inclination, more specifically the inclination of the above-mentioned fixed reference direction of the sensor.

The output signals of the above-mentioned micro-sensor elements are converted into digital data signals by analogue-to-digital converter, if needs be after prior amplification. As explained in more detail below, these digital data are connected to a microprocessor where they are buffered and analysed.

The software configuration (FIG. 6B) cooperates with the hardware configuration, and takes as input raw sensor data 6 which it enters into a data processing algorithm 8.

The raw sensor data 6 comprises at least some, and preferably all, of the outputs from the above-mentioned microsensors.

The output 10 of this algorithm comprises: pattern recognition information, as described above in section "Method for autonomous human motion pattern recognition", an orientation indication, and a distance indication. This output is entered into a navigation software 12 to provide a dead reckoning navigation function. A system software is used to process the data and generate the navigation and guidance information.

Figure 7:
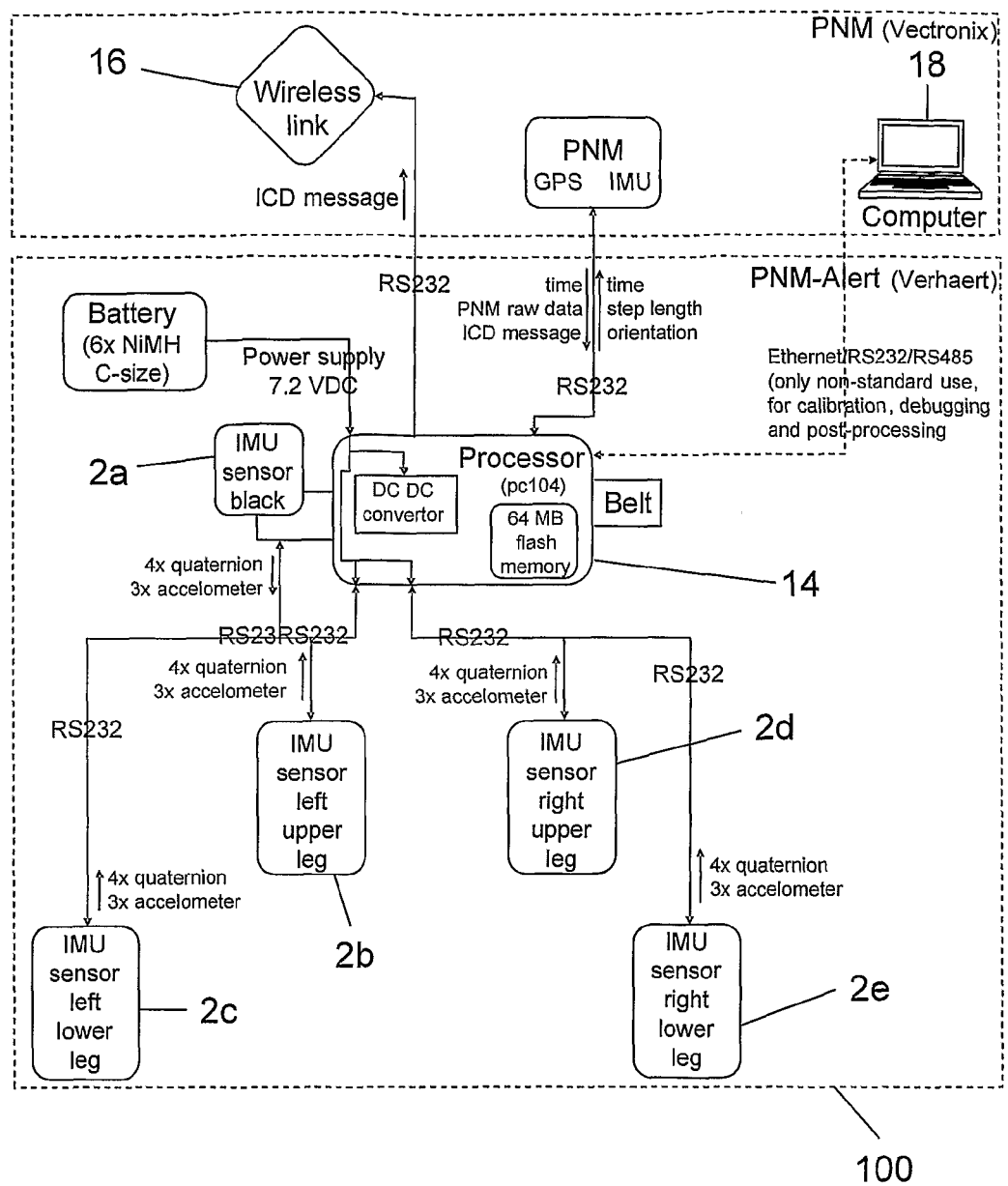
FIG. 7 is a block diagram showing the system design centered on a processor and peripheral units with sensor units in accordance with the preferred embodiments of the invention.

FIG. 7 shows the pedestrian navigation system 100 a preferred embodiment. This encompasses five IMU (inertial measurement unit) type sensors 2a-2e, the PNM 15 according to the above US patent, a processor housing and human interface, the latter including storage memory. The system 100 also comprises a battery power supply, a wearable suit including sensor attachments, and the algorithms for pattern recognition, step distance and orientation determination.

The processor 14 is worn on a belt and includes a dc-dc converter and a 64 MB flash memory. The processor is operatively connected via respective RS232 serial connections to each of the five above-mentioned sensors IMU 2a-2e. Each sensor 2 produces a 4× quaternion and a 3× acceleration data output.

In the example, the processor is supplied by a set of six C-size NiMH batteries producing a 7.2 volt dc supply voltage. However, more compact batteries can be envisaged.

The processor unit is also connected to the pedestrian navigation module (PNM) comprising a GPS and its own inertial measurement unit device, as disclosed in U.S. Pat. No. 6,826,477, whose contents are incorporated herein in their entirety by reference.

As indicated in the figure, the PNM 15 delivers time signals, raw data from its own sensors, and interface control document (ICD) messages. The PNM receives as input time signals and step length orientation data.

The processor 14 also exchanges ICD messages via a wireless link 16. The processor can be connected to an external computer 18 through an Ethernet/RS323C/RS485 link for a non-standard use such as calibration, debugging and post processing.

Each IMU sensor 2 features optimal components range, adapted for normal human motion, miniaturisation and robust design for wearability.

For each of three coordinate axes (x, y, z), the sensor 2 comprises:
- 1 gyro, in the range 400°/s,
- 1 accelerometer, in the range 3 g,
- 1 magnetometer, in the range 6 G.

It comprises an onboard floating point digital signal processor for real time calculation of 3D sensor orientation by using a Kalman filter. It also comprises a serial communications port over an RS232 link, with a data output of up to 100 hertz.

In a typical embodiment, the sensor weighs less then 70 g; its dimensions are 41 millimeters (width)×81 millimeters (length)×21 millimeters (height). Its power consumption is 150 milliamps (mA) at 5 volts DC.

The system also has a housing for a main processor and human interface. This housing incorporates:

a PC104 type board as a processing unit, comprising a Pentium II or similar processor at 233 MHz running under MSDOS 6.22, 32 MB of RAM, 128 MB of flash for two hours of data storage, four serial interfaces, and an Ethernet interface.

a human interface with two light emitting diodes, a buzzer, a rotational switch and a reset switch;

four serial connections for real time connection to the sensors;

one Ethernet connection for data download;

one power connection to a battery.

The combined processor and human interface weighs approximately 1 kg; its dimensions are 40 millimeters (width)×170 millimeters (length)×120 millimeters (height). Its power consumption is 1.5 amps at five volts DC.

As shown in FIG. 8, the rotational switch button 24 is provided on a side of its housing, and serves to activate selectively: a calibrate, a standby, and a measurement mode.

To initiate a measurement sequence, the following steps are performed:

the user activates the switch 24 to select a calibrate mode, while the line of sight (hip orientation) is kept oriented to the North during this calibration operation. The switch button 24 is made to produce a tactile and error proof switch operation;

the user then stands still for 10 to 30 seconds;

optionally, the user may make a step forward of about one meters and hold his/her position for about 10 seconds, then make a set side step of one meters and hold his/her position for about 10 seconds;

the user then activates the switch to enter the measurement mode. The measurement of data starts;

automatic measurement is then carried out;

the user next activates the switch to enter the standby mode, and the measurements stop; and a reset operation is then carried out.

Typically, the pedestrian navigation system 100 is powered by six D-size NiMH cells each of 1.2 volts, to produce a total of 7.2 volts dc. The total capacity is 8000 mA hours, giving a time range of two to four hours. The battery set has a fast charging time of three hours. It is attached together with the processor on the chest.

The battery set weighs approximately 1 kg; its dimensions are: 65 millimeters (width)×100 millimeters (length)×65 millimeters (height).

The system of FIG. 5 can thus be considered as composed of two autonomous, yet complementary, sensor systems, namely:

inertial measurement unit (IMU) sensors 2a-2e, and the personal navigation module (PNM) 15.

To determine navigation information autonomously, the PNM 15 is normally provided in a memory with one or several step models and algorithms to implement those models, as explained above. In this way, a detected step displacement of the pedestrian can be analysed using the model(s) to determine step length and/or step speed.

In the present system 100, step length information and/or step orientation information is however obtained from the IMU sensors 2a-2e and the processing of their information as explained above. The step length and/or step orientation information received by the PNM 15 can be used either instead of the step model information or in addition to the step model information.

In this way, the PNM 15 and IMU sensor system 2a-2e operate in concert to produce an optimised pedestrian navigation information output.

FIGS. 9A and 9B respectively illustrate specifically designed garments 28 and 30 for the lower leg portion and of the upper leg portion, in which the corresponding sensors are housed. The points of attachment of these garments on the pedestrian are illustrated in FIG. 9C, which also shows the three orthogonal coordinate axes at each attachment point. These garments are produced with an appropriate adhesive material together with a new modular concept of attachment. The design and technology of the garments/suit 28 and 30 is as follows:

sensor position at the outer side of the leg for comfort reasons;

housing for the five IMU sensors 2a-2e overall: back (hip level), left and right upper leg, left and right lower leg;

chest belt for processor and batteries;

IMU sensor system combined with pedestrian navigation module (PNM) sensor for coherent azimuth reference (the PNM module can be as described in U.S. Pat. No. 6,826,477);

implemented in either one of two possible variants: full pants or straps;

made stretch fabric and loop-and-a pile (Velcro-registered trademark) for easy fit.

Each IMU sensor 2a-2e is supported by a pad which is mounted between the sensor and the garment, and is made of compressible material such as foam rubber or the like.

The textile material of which the garments are made is preferably easily washable, breathable to let perspiration pass through, have a comfortable feel when worn, provide close contact with the body parts so that the sensors do not move significantly relative to the body, and stretchable so as not impede the movements of the pedestrian. An example of a suitable type of material for the garments is known under the trade mark name of "Coolmax".

Typically, the IMU sensors 2a-2e are carried at the body portions explained above, and the pedestrian navigation module (PNM) 15 is carried at the back of the waist, at hip level. The system is modular and adaptive to allow for evolutions through a flexible and adaptive distributed sensor approach, whereby one navigation platform can be used for different mission requirements, e.g. for the case where the pedestrian is an infantryman.

FIG. 10 is a schematic diagram illustrating the mathematics implemented for the motion detection aspect of the embodiment. The figure shows a stick-like representation of a pedestrian, on which are indicated the body (line of sight) axes, and the local sensor axes. Next to the human figure representation, at the bottom, are shown the three orthogonal x, y and z axes, referred to as global (align) axes.

The motion detection initially uses a calibration phase comprising:

a factory calibration to guarantee 90° angles between all axes and sensors;

field alignment to North and to vertical.

In real time operation, the motion detection comprises:

data capture (quaternions) via the RS 232 data link;

calculation of limb orientation;

calculation of joint position;

step detection;

step orientation calculation, yielding an output;

step length calculation, yielding an output;

pattern recognition, yielding an output.

The adaptation of the system to the pedestrian takes account of the pedestrian's specific body dimensions. In particular, the pedestrian's body dimensions of interest are the length of the upper and lower legs, and the distance between the hip joints. These items of dimension data are thus measured for the pedestrian concerned and entered into a memory of his/her navigation system. The processor of the navigation system implements an algorithm which takes as input:

the joint position and limb orientation data from the sensors for the body portions at which they are active, and
the above items of dimension data for the pedestrian,
to derive the positions of the pedestrian's feet at any time, by means of a geometric vector calculation. Such a geometric vector calculation is within the reach of the skilled person and shall not be detailed for reasons of conciseness.

Figure 11:
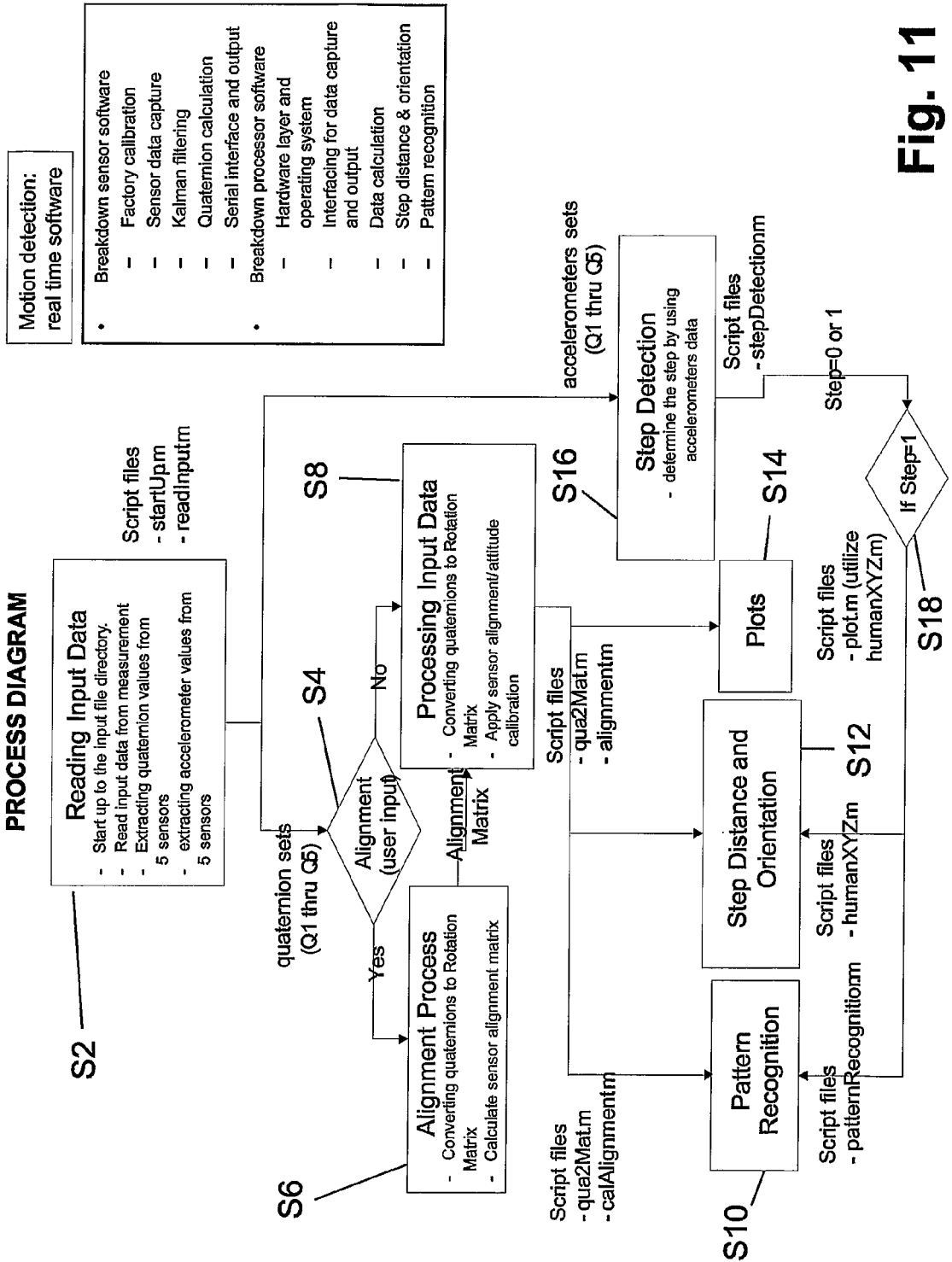
FIG. 11 is a flow chart showing the process diagram for motion detection in real time by the software implemented in the preferred embodiments.

FIG. 11 is a flow chart showing the real-time software used for motion detection in the embodiment.

The software is divided into a sensor software and a processor software.

The sensor software performs:
factory calibration;
sensor data capture;
Kalman filtering;
quaternion calculation;
serial interface and output.

The processor software comprises:
the hardware layer and operating system;
interfacing for data capture and output;
data calculation;
step distance and orientation calculation;
pattern recognition.

The process diagram of the flow charts comprises a first step (S2) of reading input data. The procedure of this step is: start up to the input file directory; read input data from measurement; extract respective quaternion values Q1 to Q5 from the five IMU sensors 2a-2e; extract accelerometer values from those five sensors.

The process then cycles each of quaternion sets Q1 to Q5 through the following steps.

The first step is to determine whether an alignment is commanded through a user input (step S4). In the affirmative, the procedure goes through the alignment process (step S6), which comprises: converting quaternions to a rotation matrix; calculating the sensor alignment matrix. The alignment matrix is then supplied as an input for the step (S8) of processing input data. (If no alignment is ordered, the procedure goes straight from the step S4 to step S8.)

The input data processing step S8 comprises: converting the quaternions to a rotation matrix; applying sensor alignment/attitude calibration. The result of this input data processing step is used to obtain: a pattern recognition (step S10), a step distance and orientation determination (step S12), and plots (step S14).

In parallel, the result of reading input data (step S2) is used to conduct a step detection (step S16), to determine whether or not a step has been made, using data from the accelerometer sets Q1 to Q5, these being provided as input from step S2. The step detection technique can be one or any number of the techniques described in section "2) Method of detecting when a step is made" above. If a step is detected (step S18), a logic signal 1 is produced, otherwise that signal is at 0. The logic 1 state of that signal is used to enable the pattern recognition and step distance and orientation determinations (steps S10 and S12).

Figure 12:
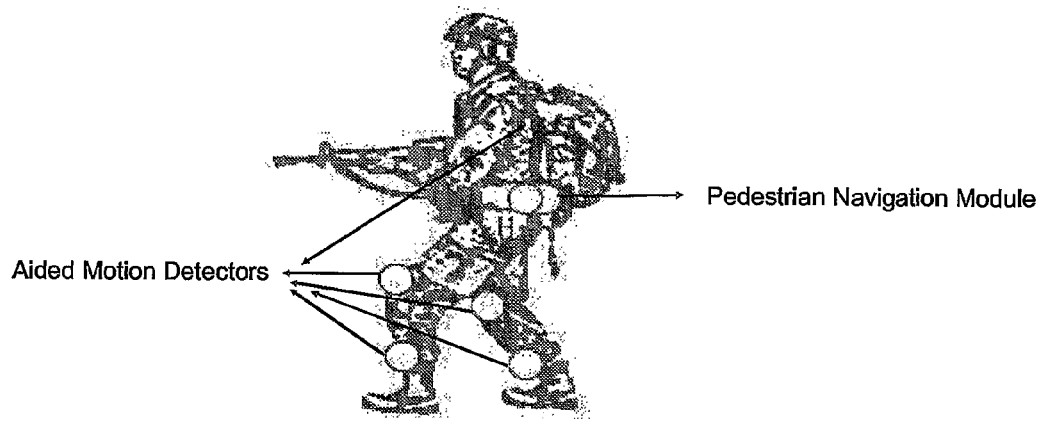
FIG. 12 is a diagram of an infantryman, showing the distribution of the sensors worn in an embodiment of the invention.

FIG. 12 is a diagram of an infantryman, showing the distribution of sensors worn, namely the IMU sensors designated here as aided motion sensors, and the pedestrian navigation module. The flexible and adaptive distributed sensor approach provides one navigation platform for different mission requirements.

Figure 13:
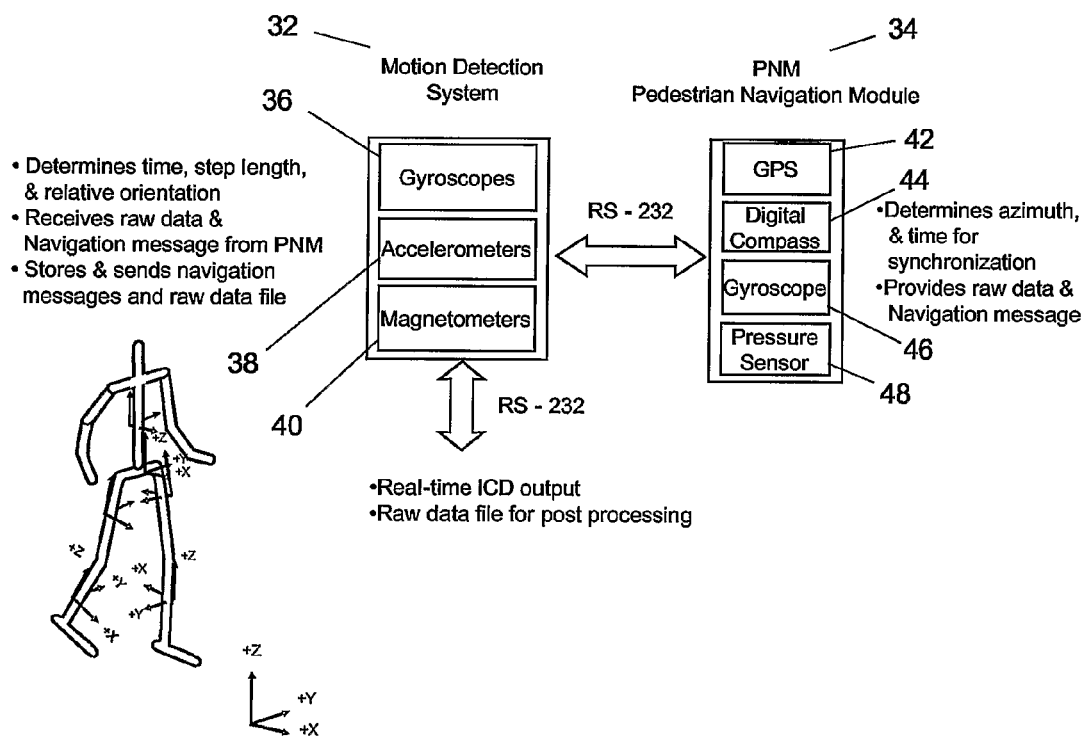
FIG. 13 is a schematic block diagram representation of an embodiment of invention showing separately a motion detection system and a pedestrian navigation module cooperating in a complementary manner.

FIG. 13, shows a system forming an embodiment, and composed of two sections: a motion detection system 32, and a pedestrian navigation module (PNM), here designated 34, both interconnected for bidirectional data exchange using an RS-232 data link.

The motion detection system 32 comprises a set of gyroscopes 36, a set of accelerometers 38, and a set of magnetometers 40. It also exchanges data using a separate RS-232 data link to produce a real time ICD out put and a raw data file for post processing.

The motion detection system 32 carries out the following functions: it determines time, step length, and relative orientation; it receives raw data and navigation messages from the personal navigation module 34, and stores and sends navigation messages and raw data files.

The personal pedestrian navigation module 34 can be based on the above-cited U.S. Pat. No. 6,826,477, which is incorporated herein by reference in its entirety. It comprises a GPS (global positioning by satellite) receiver 42, a digital compass 44, a gyroscope system 46 and a pressure sensor 48.

The pedestrian navigation module 34 carries out the following functions: it determines azimuth and time for synchronisation, and it provides raw data and navigation messages.

In the example, the pedestrian navigation module housing contains one DMC (digital magnetic compass)-SX unit, one gyroscope, one barometer, one GPS receiver and one CPU (central processing unit). The DMC-SX unit is a digital magnetic compass produced by the company Vectronix of Switzerland.

Figure 14:
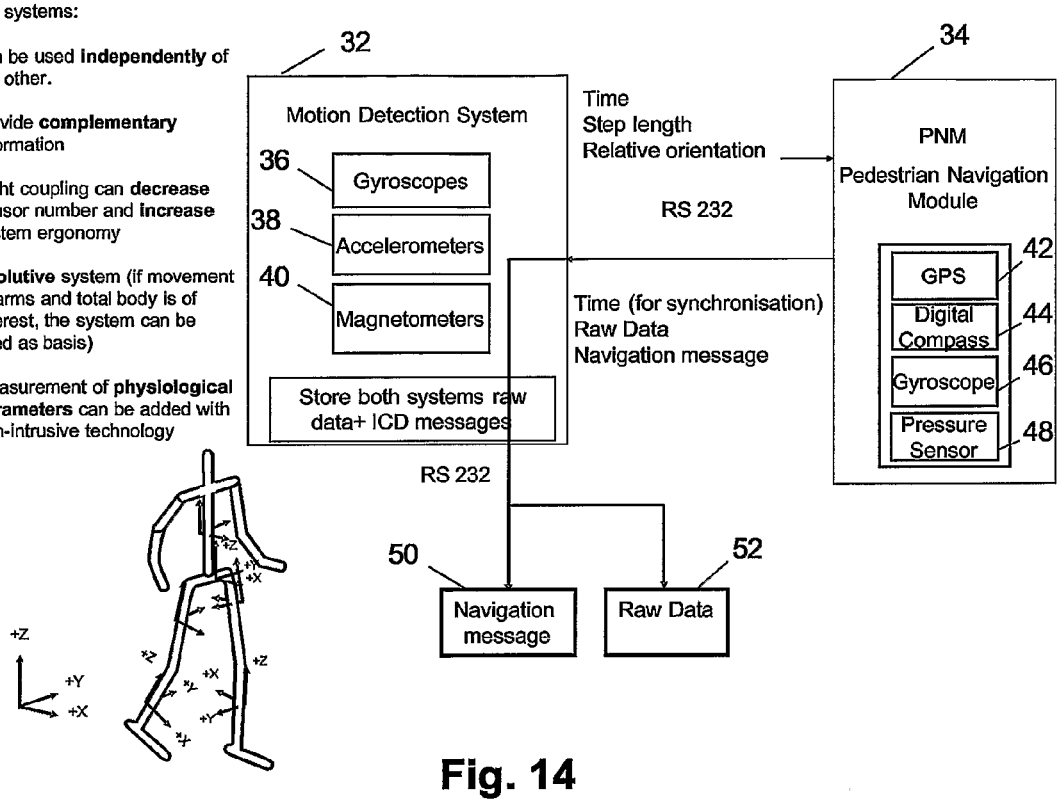
FIG. 14 is a schematic block diagram showing how the motion detection system and pedestrian navigation module of the preferred embodiments cooperate as independent but complementary systems.

FIG. 14 shows how the motion detection system 32 and the pedestrian navigation module 34 form two independent but complementary systems. The motion detection system 32 delivers time, step length and relative orientation information to the pedestrian navigation module 34. The latter delivers time data (for synchronisation), raw data, and navigation messages via the motion detection system 32. The navigation messages 50 and raw data 52 are delivered as a common output of the combined systems 32 and 34. The motion detection system 32 stores both systems raw data and ICD messages.

Both systems:
can be used independently of each other;
provide complementary information;
by virtue of their tight coupling, can decrease the number of sensors used, and increase system ergonomics;
constitute an adaptive system susceptible of evolving. For instance, if movement of the arms and total body is of interest, the system that can be used as a basis for this);
allow measurement of physiological parameters to be added with non-intrusive technology.

The following passages describe and analyse navigation data obtained by using:
the personal navigation module (PNM) alone, with or without the implementation of artificial intelligence, or
the PNM in concert with the set of five IMU sensors, as in the described system of FIG. 5 or FIG. 14,
as indicated.

Note that the present pedestrian navigation system can be adapted to allow selectively the PNM alone to function, e.g. for evaluation purposes, by excluding or switching off the IMU sensors and their associated hardware and software support.

Figure 15:
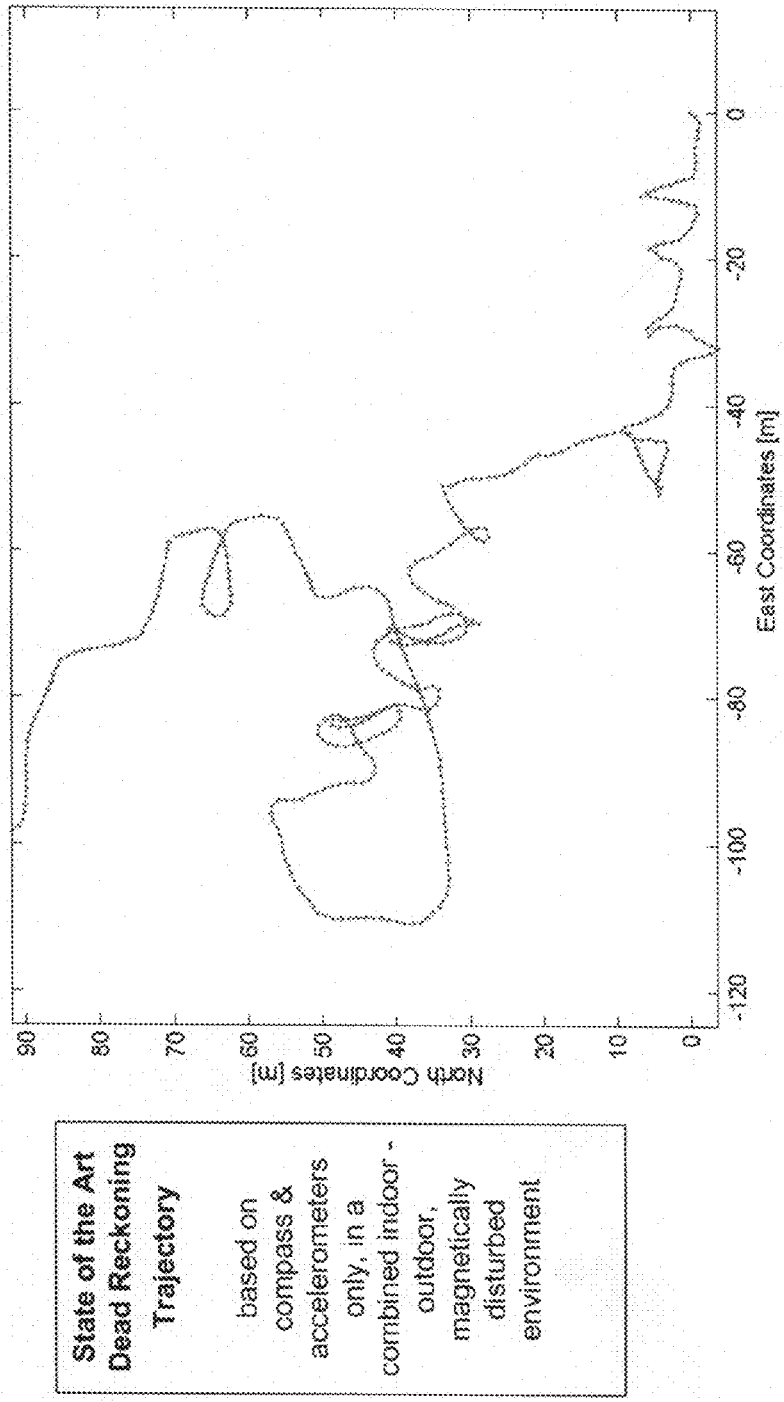
FIG. 15 is an example of a dead reckoning trajectory obtained by a personal pedestrian navigation module alone, the trajectory passing along fire escape stairs.

FIG. 15 is a plot along the North and East coordinates (indicated respectively along ordinate and abscissa axes)

indicating the detected path of a pedestrian using the personal navigation module 34 alone, having artificial intelligence in pedestrian navigation. The circle at the centre of the plot corresponds to a portion including fire escape stairs, containing iron which disrupts the local magnetic fields. The pedestrian navigation module operates according to a dead reckoning trajectory. The navigation is in this example based on compass and accelerometer data only, and in a combined indoor and outdoor magnetically disturbed environment. In this particular case, the results are sub-optimal.

Figure 16:
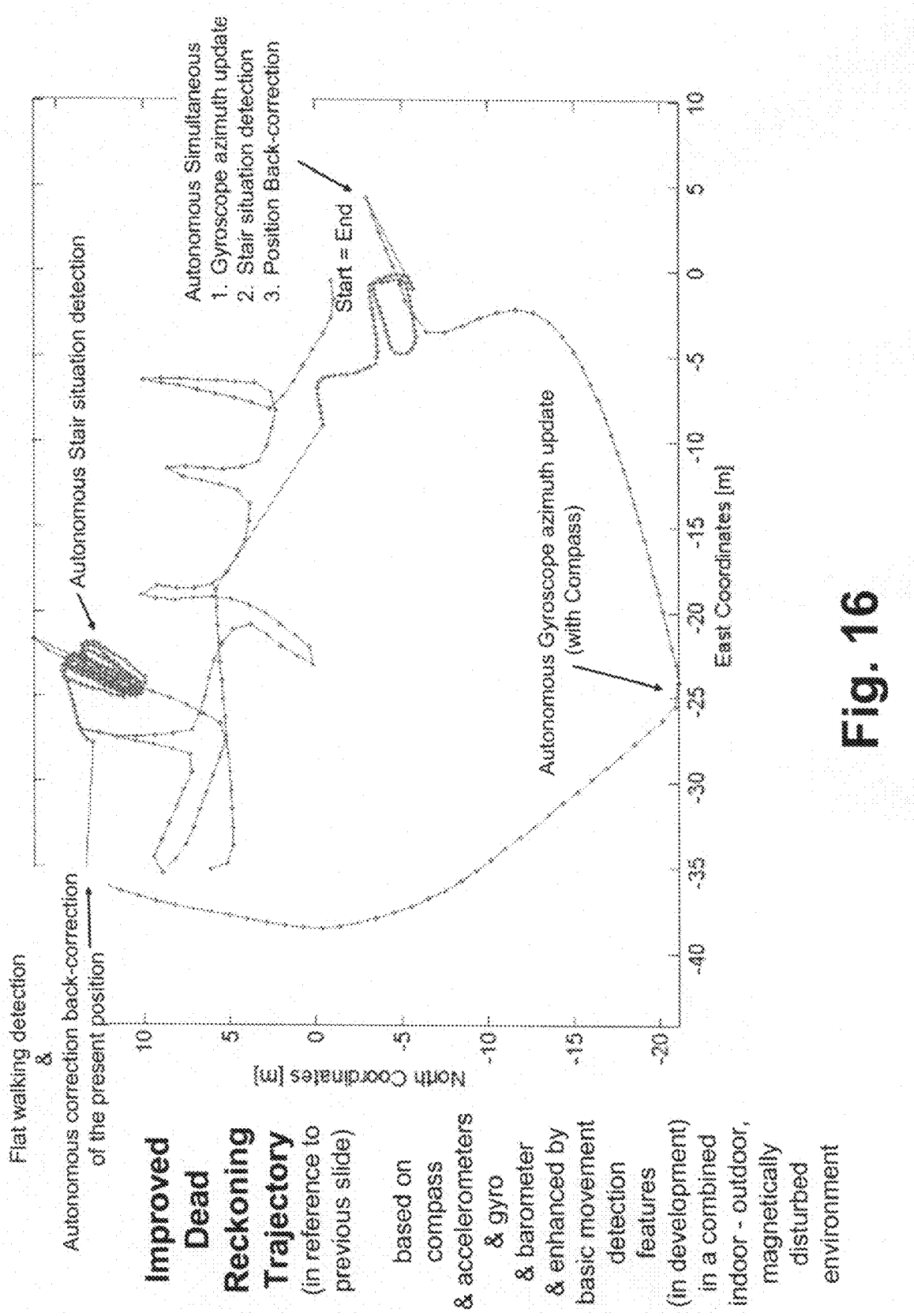
FIG. 16 is another example of a dead reckoning trajectory obtained by a personal pedestrian navigation module alone, but enhanced by the use of additional sensor data.

FIG. 16 shows another plot, also expressed along the North and East coordinates, for the case of the pedestrian navigation module 34 used alone, with artificial intelligence, but in a configuration which exploits compass data, accelerometer data, gyroscope data, barometer data, and which moreover implements an enhancement by basic movement detection features. The path was established in a combined indoor and outdoor, magnetically disturbed environment.

As indicated at the top left-hand part of a plot, a portion corresponds to a flat walking (i.e. walking along a flat surface) detection and an autonomous correction, back correction. The portion of dense lines at the top and towards the centre of the plot corresponds to an autonomous displacement situation detection in which the pedestrian is moving along stairs. The right-hand portion of the plot at coordinate bearings of approximately minus two meters north and five meters east corresponds to the start and end positions. The start and end positions coincide and are obtained by an autonomous simultaneous use of: a gyroscope azimuth update, a stair situation detection and a position back-correction. The bottom part of the plot corresponds to an autonomous gyroscope azimuth update with a compass.

Figure 17:
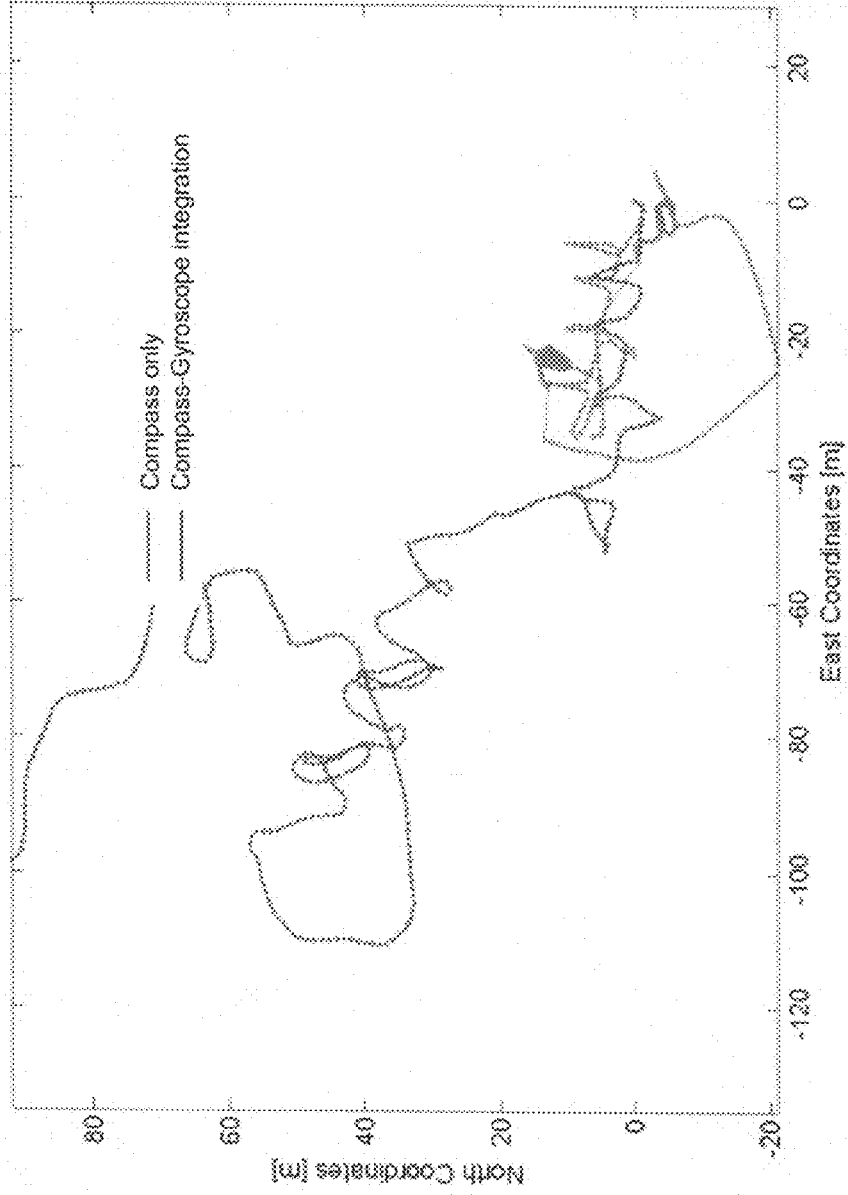
FIG. 17 is a plot showing a comparison between the examples of FIGS. 15 and 16.

FIG. 17 is another plot along the north and east coordinates using the same presentation as for the other FIGS. 15 and 16, and which provides a comparison between those two previous trajectory plots. The plot shows a portion acquired with compass only and another portion acquired with compass and gyroscope integration.

Figure 18A:
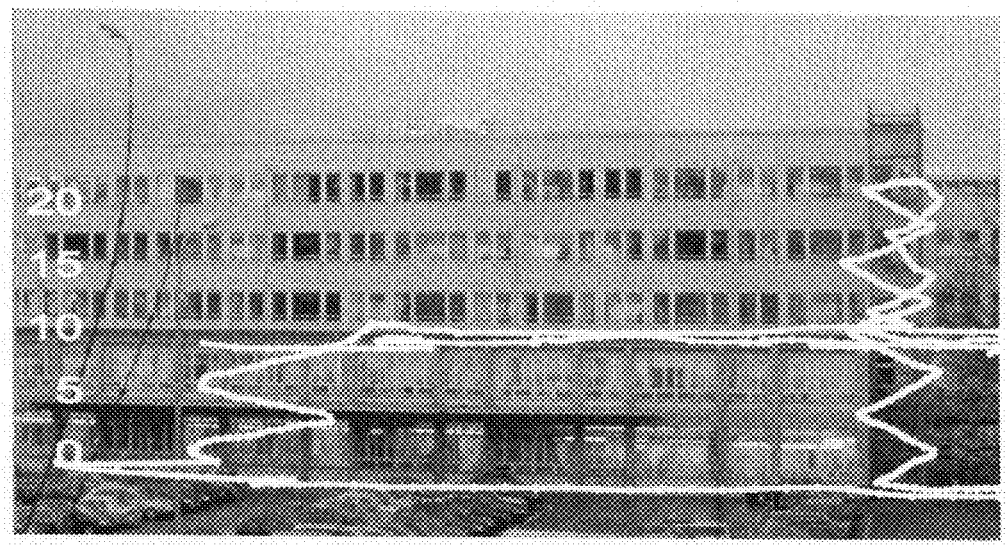
FIG. 18A is a representation of the frontage of the multi storey building with a fire escape staircase, on which is superimposed in line form a trajectory of a pedestrian using a pedestrian navigation module alone.

FIG. 18A is a representation of a multi-storey building which includes a fire escape staircase. Shown on this representation is a line sequence corresponding to a trajectory of a pedestrian wearing the pedestrian navigation module alone as he walks about the building. It can be noted that the pedestrian navigation module alone is capable of detecting the current elevation of the pedestrian after he has climbed up/down stairs of the fire escape, showing the use of this module when floor-level information is of importance. The pedestrian navigation module alone used to acquire this plot implements artificial intelligence.

Figure 18B:
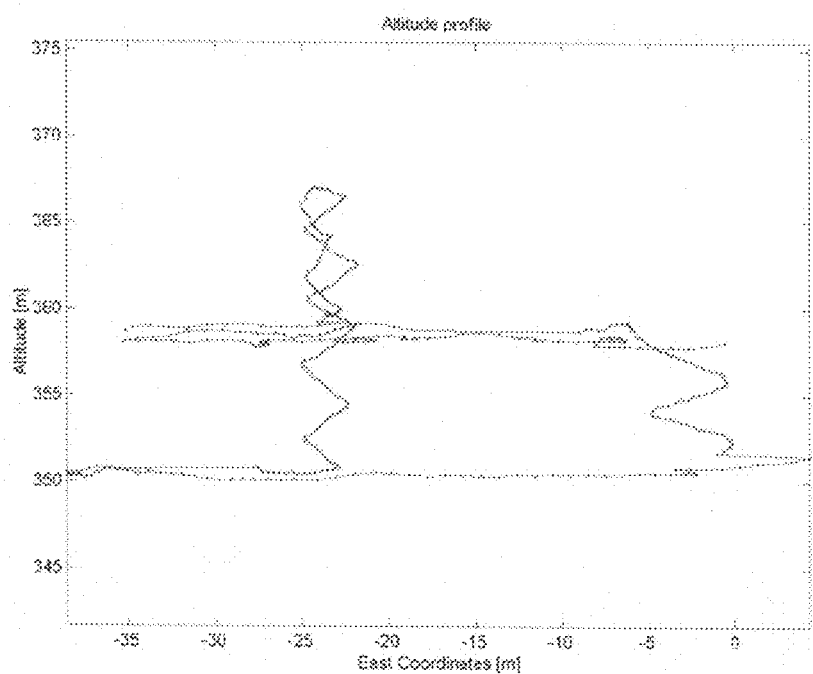
FIG. 18B is a plot showing the variation of one coordinate and an altitude taken from the trajectory of FIG. 18A.

FIG. 18B shows the corresponding trace along a set of axes in which the ordinate represents altitude in meters and the abscissa represents the east coordinates in meters (the plot is slightly shifted compared to the one indicated in FIG. 21A). Both FIGS. 18A and 18B show the change in altitude as the pedestrian uses the stairs.

FIG. 19 shows two superimposed plots for a pedestrian making lateral displacements. Each plot shows along an ordinate axis accelerometer data for the y coordinate direction and, along the abscissa, the number of samples measured. The topmost plot traces the motion of the pedestrian as he makes sidewalks (side steps) to the left, while the bottom most plot traces the motion of the pedestrian as he makes sidewalks to the right. In both cases, lateral movements of the pedestrian are established by a comparison of the slopes in the accelerometer signal.

Figure 20:
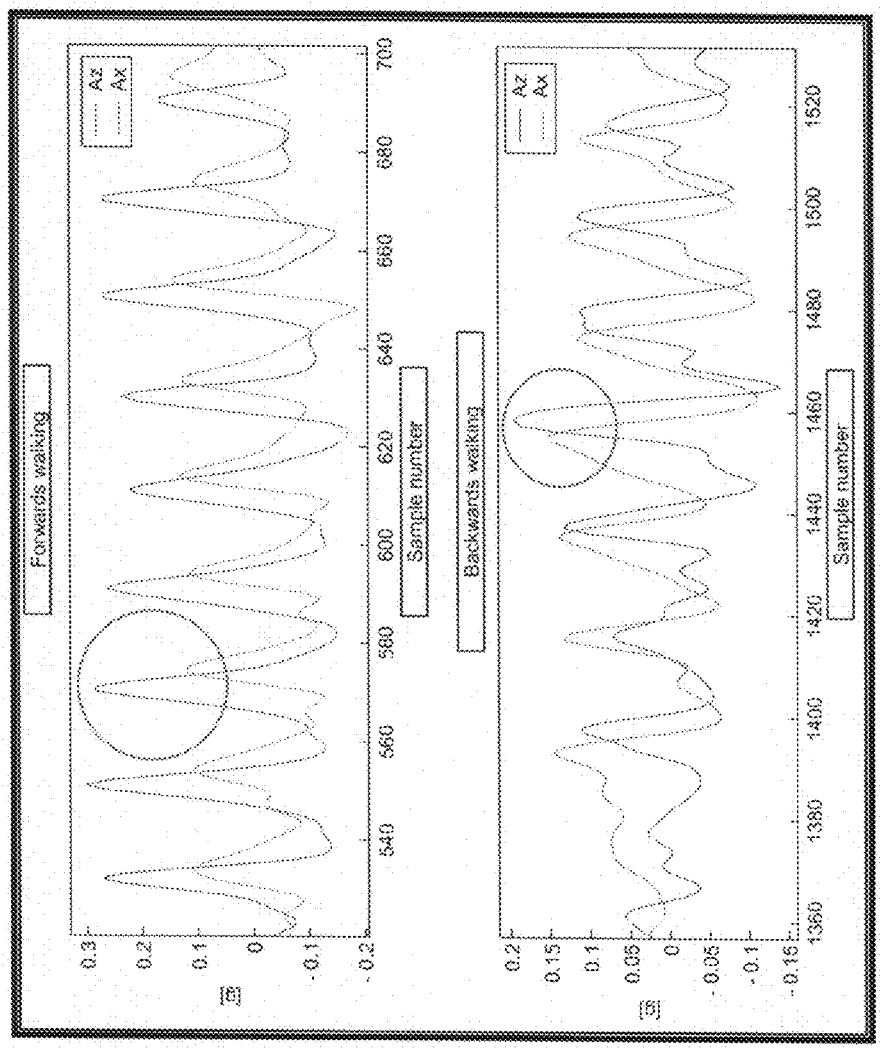
FIG. 20 shows two plots of accelerometer signals during lateral displacement movements of a pedestrian, obtained by a personal pedestrian navigation module alone.

FIG. 20 shows two superimposed plots analogous to those of FIG. 19, but for a pedestrian making forward and backward movements, respectively indicated by the topmost and bottommost plots. The forward/backward displacement of a pedestrian is referred to as an antero-posterior displacement or movement, designated by the abbreviation "AP". In the plots of FIG. 20, the ordinate axis expresses the accelerometer signals for both the accelerations in the z-coordinate direction and in the x-coordinate direction, these being designated respectively Az and Ax. The AP movements of the pedestrian are established by a comparison of the maxima in the accelerometer signals Ax and Az, as indicated by the circles on the plots.

The information thus acquired is limited to a restricted set of motions. It does not provide information about the azimuth of the motion or the distance covered. There is also no information redundancy to validate the motion.

There shall now be described some more specific aspects regarding the software, hardware, algorithms and test and evaluation applicable the embodiments of the invention.

The specifics of the pedestrian navigation system enable the tracking of the pedestrian's position, both indoors and outdoors, and enhancements are provided, for the interpretation and detection of various kinds of movements.

The system of five sensors 2a-2e, here serves as a basis for human motion tracking and for enhancing distance and position calculations.

Body Motion Pattern Recognition.

This recognition possible by the pedestrian navigation system covers:
forwards-backwards (antero-posterior) and left-rights sidewalks/sidesteps (lateral) walking motion,
crouching, and
climbing-descending stairs
Motion Analysis
Sensor Definition In what follows, the following abbreviations are used for the IMU sensors 2a-2e utilised (in terms of the body portions to which they are associated):
IMU1=left lower leg
IMU2=left upper leg
IMU3=back
IMU4=right upper leg
IMU5=right lower leg
Body Motion Pattern Recognition.
Forward Walking The data from the sensors for forward walking are shown in FIG. 21.

This figure comprises a set of fifteen graphs, arranged in five rows and three columns. Each row corresponds to a specific one of the IMU sensors, starting with IMU1 at the top row, and evolving in number order. Each column corresponds to a vector along the coordinate direction, as follows: left-hand row=Sensor X direction vector, middle row=sensor Y direction vector, and right-hand row=sensor Z direction vector.

Each of the fifteen graphs contains three traces or plots identified by letters "a", "b" and "c" respectively, as follows: a: component of sensor vector in earth X-frame; b: component of sensor vector in earth Y-frame; c: component of sensor vector in earth Z-frame)

Figure 21:
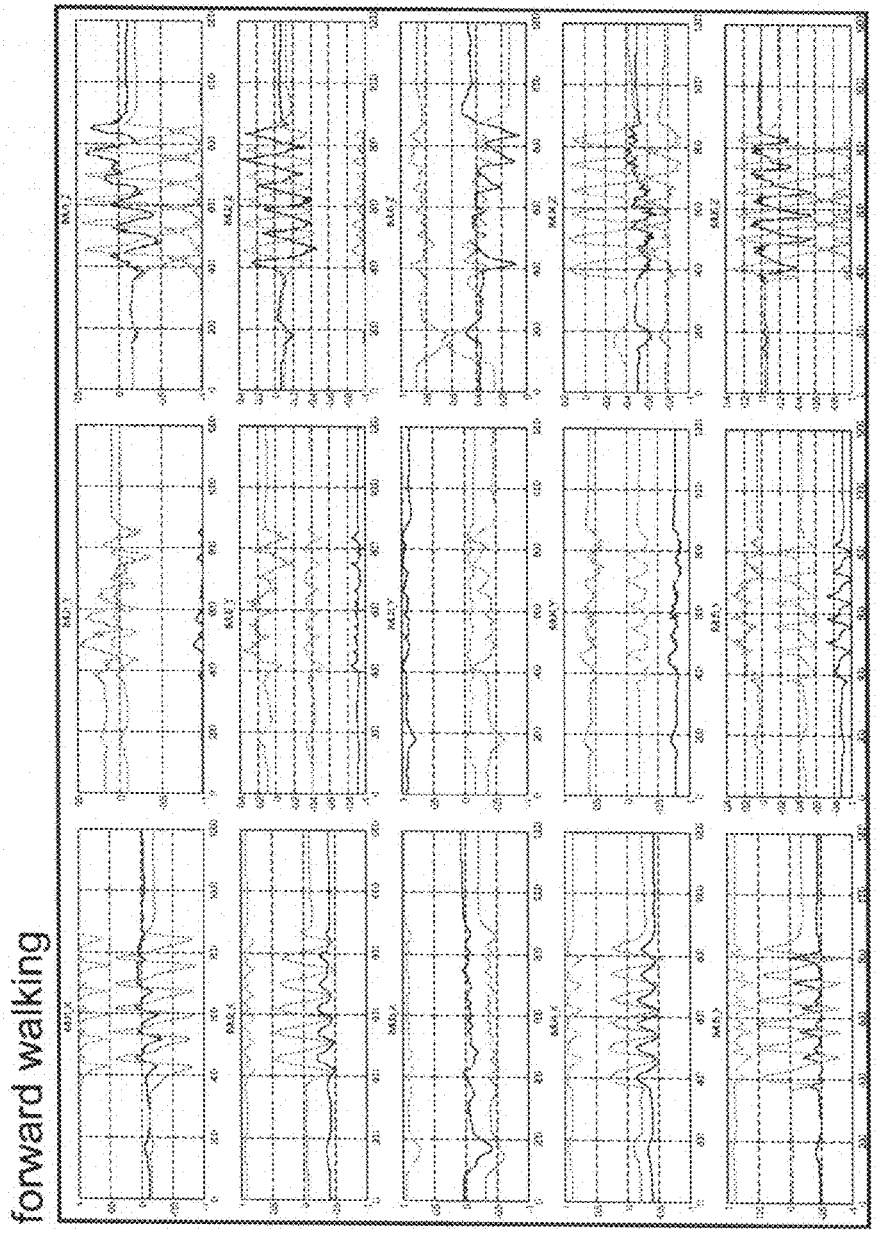
FIG. 21 comprises a set of 15 graphs showing respectively the outputs of five inertial measurement unit (IMU) accelerometer outputs for each of position of vectors X, Y and Z, during a forward walking displacement.

FIG. 21 thus shows XYZ from 5 IMU's in earth frame ($1^{st}$ row=sensor 1, etc.; $1^{st}$ column=sensor X vector, $2^{nd}$ column=sensor Y vector, $3^{rd}$ column=sensor Z vector).

Figure 22:
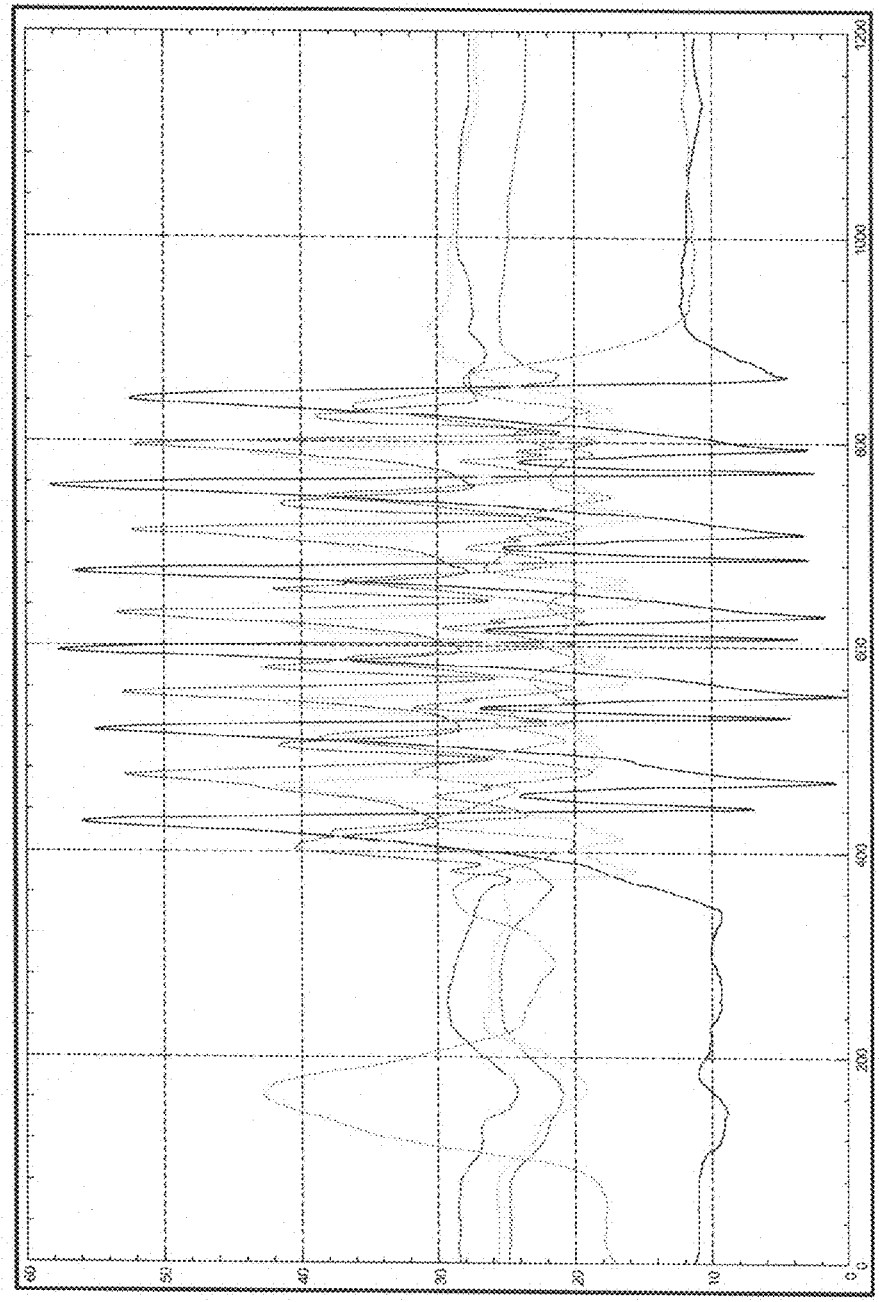
FIG. 22 shows the traces of the five IMU accelerometer outputs showing inclination data over successive data samples for a forward walking motion.

FIG. 22 is a graph indicating the inclination data each of the five IMU sensors, as indicated.

Figure 23A:
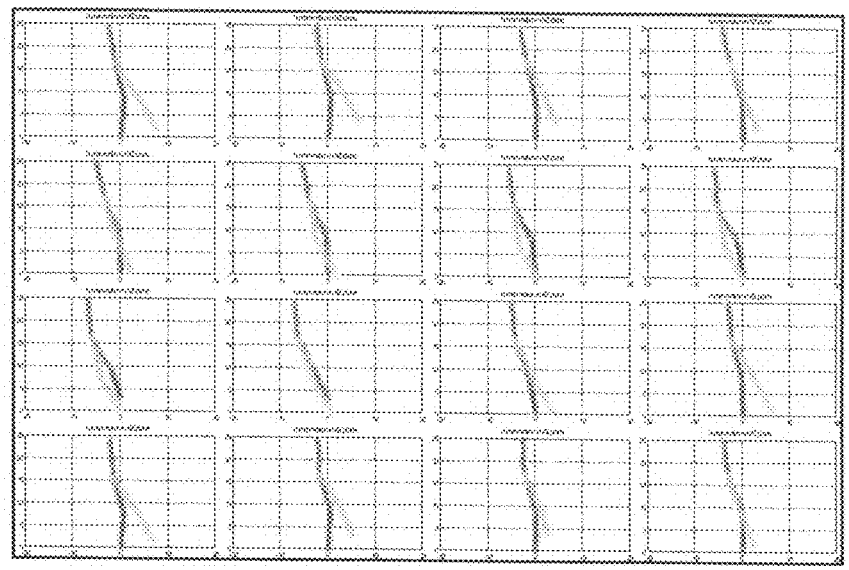
FIG. 23A comprises a set of 16 plots showing the evolution of sensor positions in the earth XZ frame as a pedestrian walks in a forward direction.
Figure 23B:
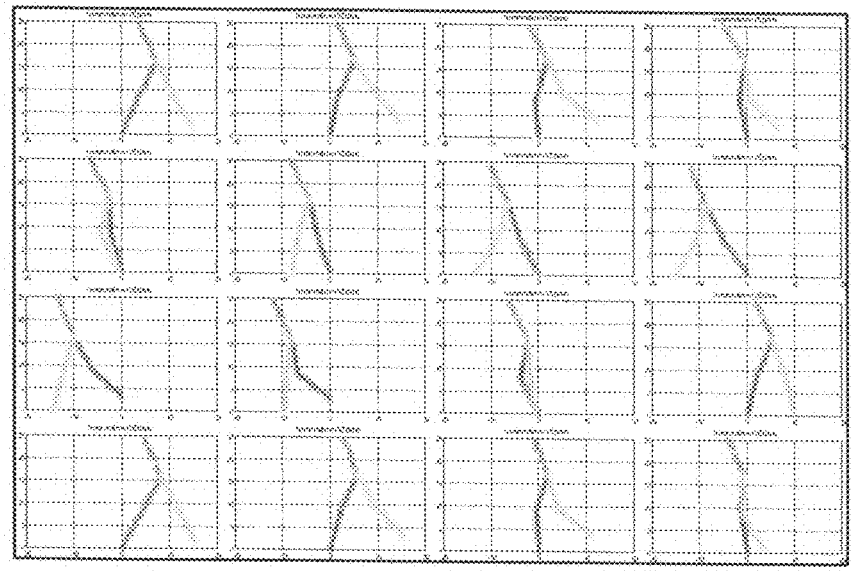
FIG. 23B comprises a set of 16 plots showing the evolution of sensor positions in the earth YZ frame as a pedestrian walks in a forward walking direction.

FIGS. 23A and 23B each comprise a set of 16 plots which give the orientation of the human being, equipped with the IMUs, at different time steps projected in the earth XZ frame (FIG. 23A) and in the earth YZ frame (FIG. 23B). The following designations are used to identify on the plots the body portions of the pedestrian: B: back, L: left leg, R: right leg. The successive plots are made at 140 ms time intervals The plots here are made to indicate the different motion types and are not made accurately representative for the real human orientation.

For example, the lines indicate the orientation of the sensors and not the segments of the human body. For this, the body orientation has to be calibrated by correcting for the orientation of the sensor on the body segment. It is clear from the orientation of the sensors at standstill, that this effect is significant. This calibration is performed in the section on step distance measurement.

Another improvement in the presentation of the body orientation is to represent the orientation in the plane of the X- and Y-axis of the body back sensor and in the plane of the X- and Z-axis of the body back sensor, respectively. This provides a better representation of the division between side and forward motion of the legs. This calibration is performed in the section on step distance measurement and the section on step orientation determination.

Step Distance Measurement.

The gait cycle is divided in two phases: the stance phase and the swing phase. During the stance phase, the foot is in contact with the ground. In the swing phase, the foot is lifted off the ground and carried forward to begin the next cycle. Both legs repeat the same cycle, but 180° out of phase.

A difference is made between walking (forwards, sideways, etc.) and running (or jumping). In the first case, there is a short overlap between the end of the stance phase of the one leg and the start of the stance phase of the next leg. In the second case, there is no overlap between both stance phases.

A combination of two methods is used: one for walking and one for running. Both methods are accurate in different dynamic conditions.

Step Measurement Method for Walking.

When walking (forward, sideways, crab walking, etc.), there is a phase in the motion, where both feet touch the ground simultaneously. At this moment, the step distance is roughly equal to the projection of the leg segments on the ground, which can be computed from the measured leg segment orientations and the length of the body leg segments.

The accuracy of this method is determined by:
the accuracy of the measured leg segment orientations,
the accuracy of the kinematic model of the different motions, i.e. the accuracy with which the different motion types can be reproduced from the leg segment measurements,
the accuracy of the leg segment length. This can be improved by a calibration procedure in which the tracked person makes some predefined motions with fixed step size.

The step distance measurement is validated on a test sequence called forward_80. The test person was walking along a straight line with a constant step length. The floor was marked with regular tags of 80 cm, where the person should put the step.

Forwards_80 Motion

To compute the step length, the measured sensor unit is calibrated for the misalignment of the sensor on the body. This is performed by using the attitude at the calibration period (when standing still) as reference attitude. For this motion, the average of the attitude between sample numbers 600 and 800 was taken as a reference.

Figure 24A:
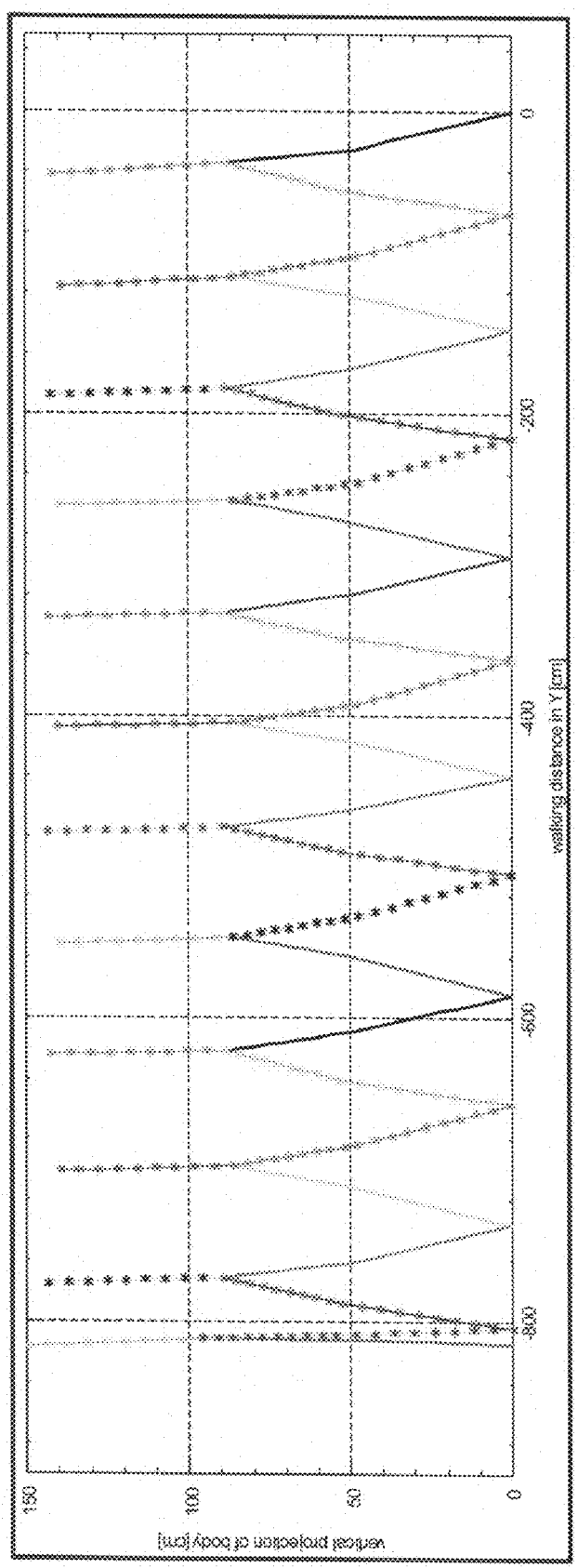
FIG. 24A is a plot of the projection along the XZ plane as the pedestrian's motion is at the step moment, defined as the moment when the foot is put on the ground after the swing motion of leg.
Figure 24B:
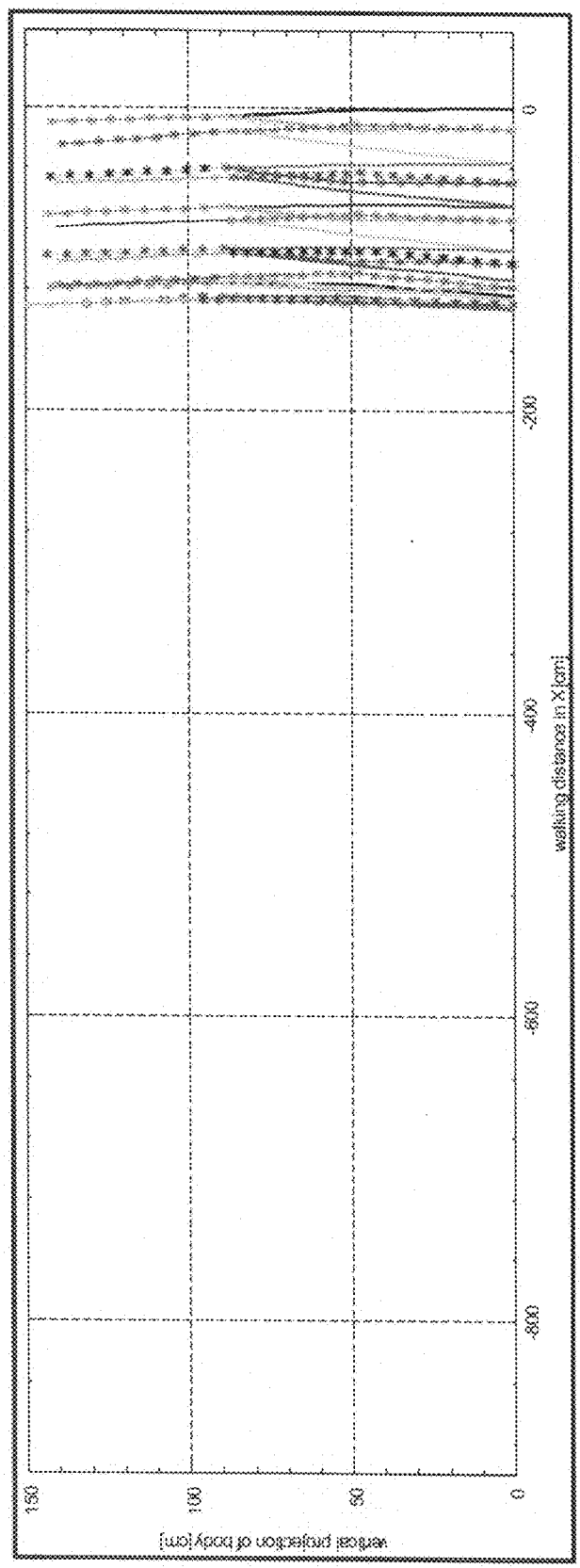
FIG. 24B is a plot of the projection along the YZ plane as the pedestrian's motion is at the step moment.
Figure 24C:
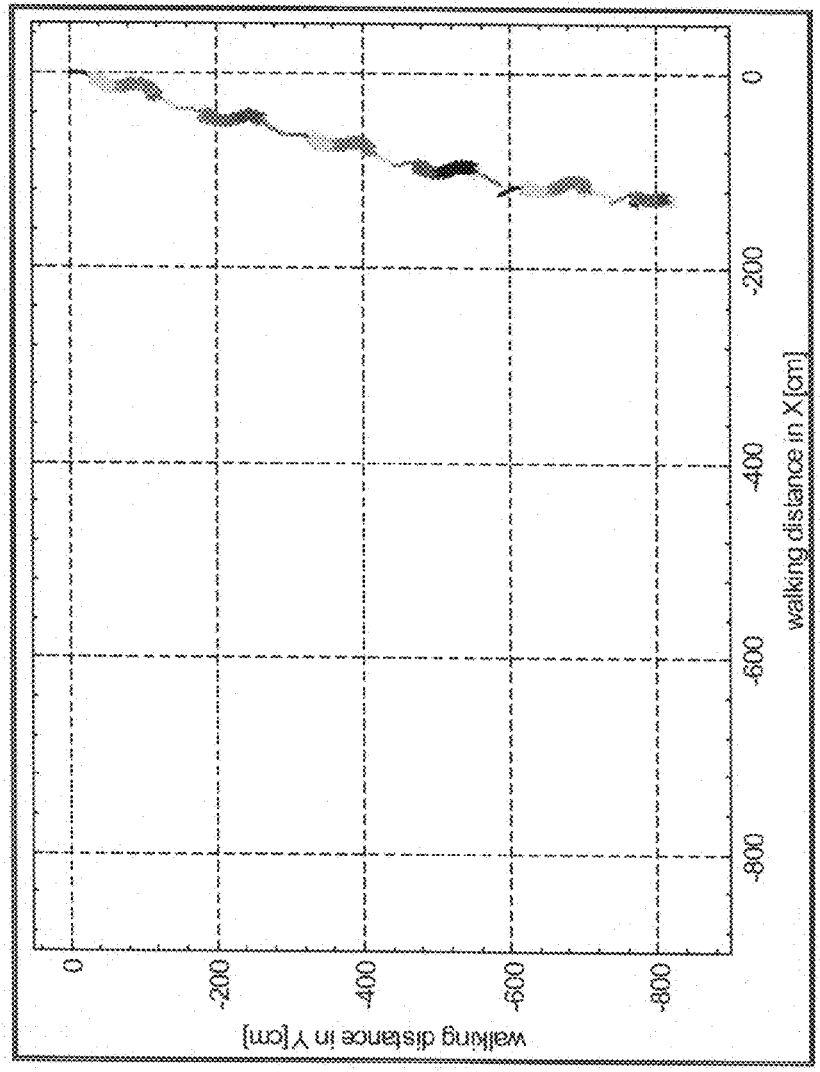
FIG. 24C is a plot of the projection along the XY plane as the pedestrian's motion is at the step moment.

FIGS. 24A, 24B and 24C are three plots showing the projection of the person respectively on the XZ-, the YZ- and XY-plane of the earth at the 'step moments'. In all three plots, the vertical projection of the body in cm is indicated on the ordinate, while the walking distance in cm is indicated in the abscissa. This distance is along the Y axis for FIG. 24A, and along the X axis for FIGS. 24B and 24C. The 'step moment' is defined as the moment where the foot is put on ground after the swing motion of the leg. At this moment, both feet are touching ground. The physiological properties are taken as the length of the leg segments:
lower leg segment=43+12 cm
upper leg segment=41 cm The plots show that the motion is almost completely in the North direction.

At the 'step moment', the step distance is computed as the projection of the leg segments on ground.

Figure 25:
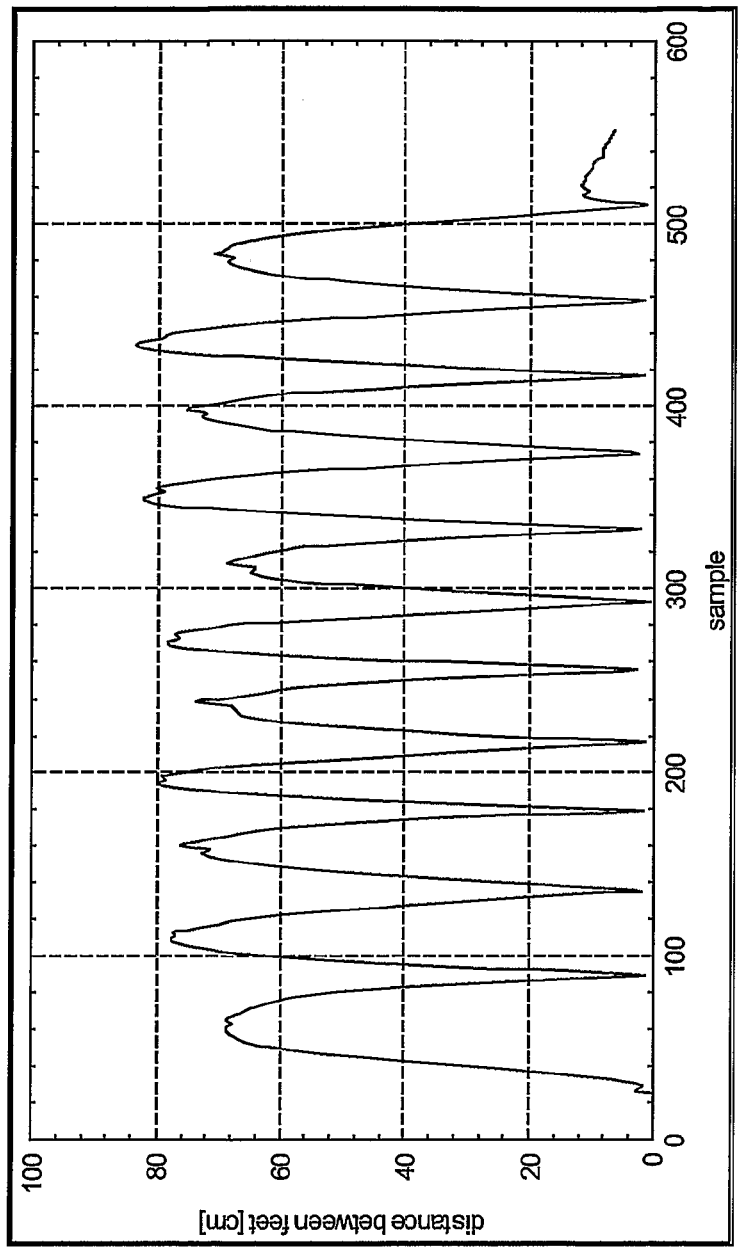
FIG. 25 is a plot showing the distance between 2 feet versus time along the earth's X-axis during motion.

FIG. 25 is a plot which shows along the ordinate the distance in cm between the two feet along the earth's X-axis during the motion, over time samples along the abscissa. The distance is zero when both legs cross each other in the middle of the swing and is maximal at the 'step moments'.

The table below gives the computed step lengths.

| Step # | First leg | Step length in X [cm] | Absolute step length [cm] | Deviation from resp. left_mean and right_mean [cm] |
|---|---|---|---|---|
| Step 1 | Right | 68.3 | 69.7 | 0.30 |
| Step 2 | Left | 76.7 | 79.9 | −0.11 |
| Step 3 | Right | 71.5 | 72.6 | 3.21 |
| Step 4 | Left | 78.7 | 80.1 | 0.08 |
| Step 5 | Right | 68.2 | 68.9 | −0.49 |
| Step 6 | Left | 77.2 | 79.7 | −0.31 |
| Step 7 | Right | 64.4 | 64.9 | −4.48 |
| Step 8 | Left | 79.8 | 80.6 | 0.52 |
| Step 9 | Right | 72.1 | 72.3 | 2.89 |
| Step 10 | Left | 79.6 | 79.9 | −0.17 |
| Step 11 | Right | 67.9 | 68.0 | −1.43 |

Column 1 gives the number of the step. The measurements clearly show 11 steps.

Column 2 gives which leg was in front, i.e. which leg just ended the swing phase.

Column 3 gives the computed step length along the earth's X-axis, i.e. in the direction of North.

Column 4 gives the absolute step length computed by combining the step length in X- and Y-direction. The figure below shows this value for the different steps.

Figure 26:
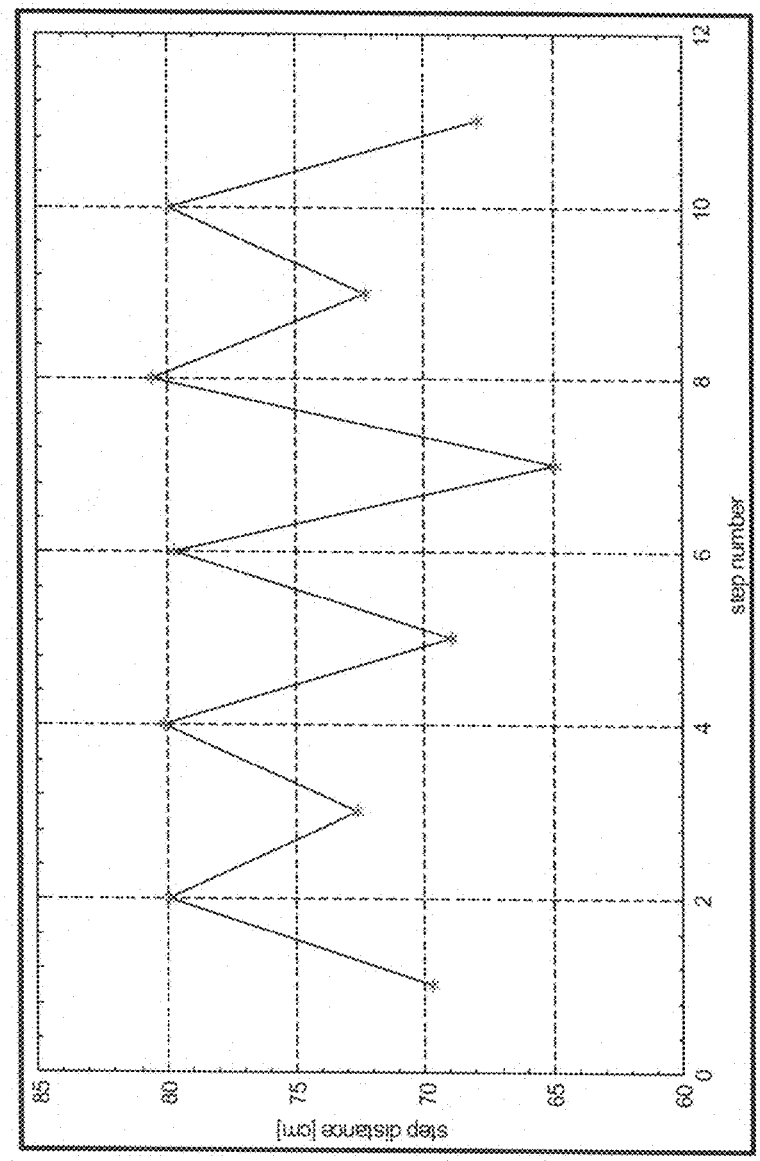
FIG. 26 is a plot of step length for different steps made by a pedestrian.

FIG. 26 is a plot of step distance in cm (along the ordinate) versus step number for the different steps of the above table.

FIG. 26 and column 4 of the above table clearly show both types of passes give a different step length. The length for the steps-with-left-leg-in-front give a very repetitive result around 80 cm. The steps-with-right-leg-in-front are less repetitive and vary between 65 cm and 72.6 cm. The mean step length for both types of steps is:

| Mean computed step lengths for right leg: | right_mean = 69.41 |
|---|---|
| Mean computed step lengths for left leg: | left_mean = 80.05 |

Column 5 of the above table gives the deviation on the mean for respectively the left and right leg. The maximum deviation for steps-with-left-leg-in-front is 0.5 cm or 0.6%. The maximum deviation for steps-with-right-leg-in-front vary is 4.5 cm or 6.4%.

Since both step distance computations make use of all 4 leg segment measurements, there is no reason why the computation for one type step is more accurate than the other. Therefore, the best measurement of the step length is the average of all steps or approximately 75 cm, i.e. the best measurement of a step is half the length of a stride (definition from Stirling et al., 2003).

The accuracy of the average step size is not only dependent on the accuracy of the sensors, but also on:
 the calibration procedure;
 the kinematic model.

The calibration can be further refined. For example, a close look to the above plot showing the different steps in X-direction, indicates an asymmetry between both step types. The steps-with-right-leg-in-front are performed with a knee which is not completely stretched, while the steps-with-left-leg-in-front are performed with an overstretched knee. In practice, both step types are probably performed identically with a fully-stretched knee.

The step distance measurement is based on the simplest possible kinematic model: the body is composed of five segments with perfect joints. The human body motion is obviously much more complex. A quick measurement indicated that this effect can be significant.

Figure 27:
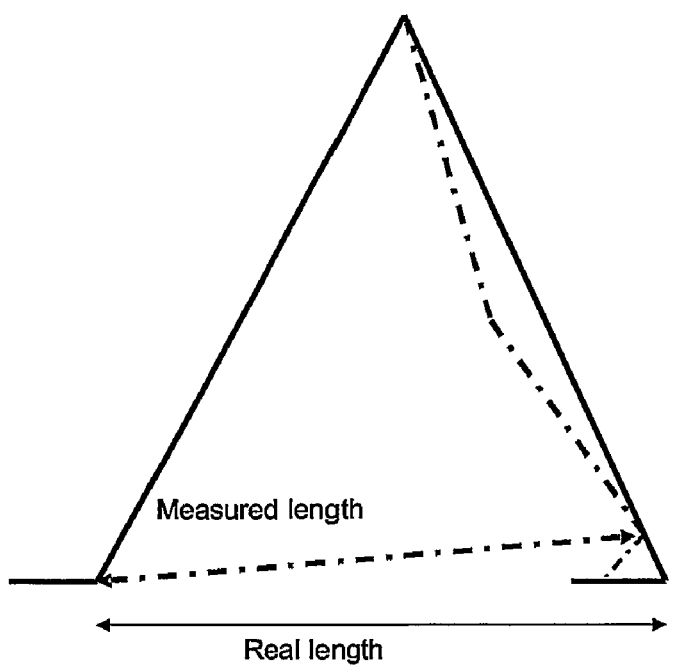
FIG. 27 is a diagram illustrating both the measured length of a step and the real length of the step.

As shown by FIG. 27, when making a large step of 80 cm, usually both heels are not touching the ground at the step moment, as shown on the figure below. A test was performed with a person of 1 m80 making steps of 80 cm. At the step moment, the distance between both heels was measured to be 75 cm, which is exactly the same as was obtained from the above analysis of the measurements.

Other kinematic effects can also influence the accuracy, such as the rotation of the hips. This can also lead to an underestimate of the step length.

It can thus be concluded that the lack of a kinematic model leads to:
 an underestimate of the step size, and to
 an error of the same order of magnitude as obtained in the above analysis.

Under the (realistic) assumption that a better calibration procedure and a kinematic model will improve the absolute accuracy of the step length, the deviation from the mean, which is a measure for the repetitiveness of the method, is a better parameter to judge the accuracy of the method.

The above analysis of the variation per step assumes that the test person made steps with perfectly repetitive length.

Step Measurement Method for Running.

When a person running, there is no phase where two feet touch the ground simultaneously. The preferred embodiment uses in this case the method from Stirling et al. (2003), where the step size is obtained by double integration of the foot accelerations during the swing phase of the motion. The method can conceivably work with a sensor on the lower leg. Theoretically, the double integration also gives a value for the orientation of the step.

Figures 28A, 28B:
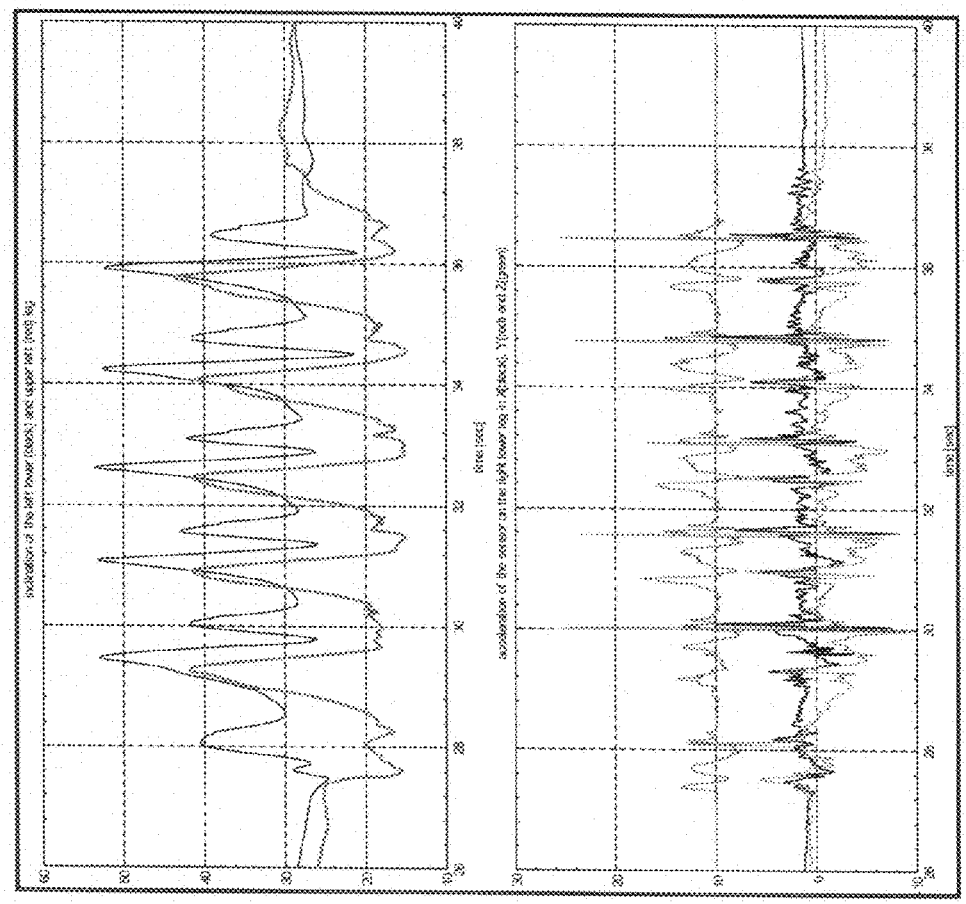
FIG. 28A shows the traces of inclination signals versus time when a pedestrian is running.
FIG. 28B shows the traces of acceleration signals when a pedestrian is running.

FIGS. 28A and 28B are plots showing the measured acceleration of the lower leg, giving a qualitative analysis of the feasibility of the above method using the IMU sensors. Both figures are plots against time using the same time scale (in seconds).

FIG. 28A indicates the inclination on its ordinate. Two curves are shown: the inclination of the left lower leg, given by curve designated a, and the inclination of the upper left leg, given by curve designated b.

FIG. 28B indicates the accelerometer signal on its ordinate of the right lower leg accelerometer for forward walking. Three curves are produced respectively for the accelerometer signal in the three orthogonal directions: x-direction given by curve designated A, y-direction given by curve designated B, and z-direction given by curve designated C.

The IMU sensor producing the acceleration plot was mounted on the lower leg, with the Y-vector in vertical direction and the Z-vector in the direction of the foot and the X-vector completing the right-handed frame. The sensors giving the inclinations and the sensor giving the acceleration are not switched on simultaneously. The synchronicity of the both measurements is therefore performed by manually shifting one time axis.

The inclination of the lower leg shows two maxima during one step (FIG. 28A shows the absolute value of the inclination). The lower maximum is obtained when the leg is set on ground in front of the body, i.e. at the start of the stance phase. The higher maximum is obtained when the leg is behind the body as part of the swing phase. Projected on the plane of the motion, the inclination goes through zero in-between both maxima. Since the inclination has also a component perpendicular to this plane, mainly due to the mounting of the sensor on the leg, this is not the case in FIG. 28A.

The acceleration FIG. 28B shows high peaks in the acceleration at start of the stance phase. Strangely, these peaks are higher for the in-plane accelerations than for the vertical acceleration. After the peak, the stance phase is characterized by a constant behaviour of the vertical component of the acceleration, being equal to 1 g. The swing phase is characterised by an oscillatory behaviour in mainly the Y- and Z-vector.

It can be noted that the accelerometers measure both the gravity vector and the acceleration of the leg segment motion, as given in the equation below:

$$f_{accelerometer} = C_{earth\_to\_IMU} \begin{bmatrix} 0 \\ 0 \\ g \end{bmatrix} + acc_{IMU}$$

where $f_{accelerometer}$=accelerometer signal;
 $C_{earth\_to\_IMU}$=rotation matrix from earth frame to IMU frame;
 $acc_{IMU}$=real acceleration of the IMU sensor.

During the swing, part of this oscillation in the accelerometer signal is caused by the leg segment acceleration through the air, and another part by the change in orientation of the leg, distributing the gravity field force between the three acceleration components.

The proposed step measurement method assumes that the leg segment orientation, $C_{earth\_to\_IMU}$, is known. It obtains the real leg acceleration by subtracting the 1 g vector from the accelerometer measurements using the orientation computed in the IMU sensor.

However, the IMU sensor algorithm is such that it makes a fusion of the gyros, the accelerometer and magnetometer to compensate for gyro drift in the computation of $C_{earth\_to\_IMU}$. The method makes the assumption that the long-term component of the real acceleration ($acc_{IMU}$) is zero: it uses the accelerometer as an inclinometer.

Both methods are thus based on conflicting assumptions. To solve the conflict, two phases in the motion can be found, where only one of the assumptions is valid. A division would be the above physical division between stance and swing phase. In the stance phase, the accelerometer signal can be used as inclinometer to reset the gyro drift. In the swing phase, the orientation is purely defined by the gyros, allowing double integration of the real leg segment acceleration to determine the step size.

Relative Orientation of Body Segments.

The ability of the IMU sensor to determine relative heading/azimuth of the body segments, is demonstrated on two motion types:

crab walking motion;

45°_80: walking in a direction of 45° with respect to the torso direction.

Crab Walking

Figure 29:
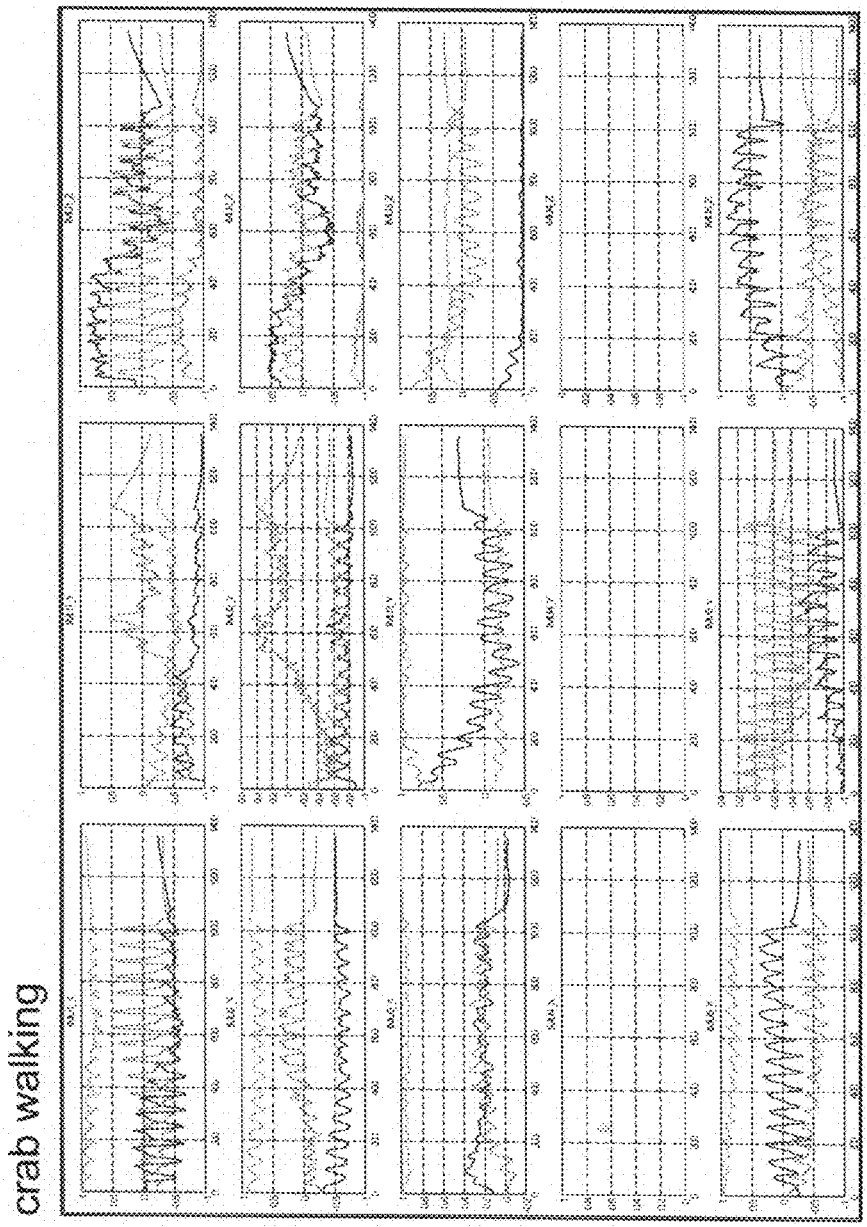
FIG. 29 comprises a set of 15 graphs showing the outputs of five accelerometer outputs for each of position of vectors X, Y and Z, during a walking in a crab displacement motion.

FIG. 29 shows the orientation of the X-, Y- and Z-vector of the sensors in the earth frame. The data of the sensor on the right upper leg is missing.

This figure comprises a set of fifteen graphs, arranged in five rows and three columns. Each row corresponds to a specific one of the IMU sensors, starting with IMU1 at the top row, and evolving in number order. Each column corresponds to a vector along the coordinate direction, as follows: left-hand row=Sensor X direction vector, middle row=sensor Y direction vector, and right-hand row=sensor Z direction vector.

Each of the fifteen graphs contains up to three traces or plots identified by letters "a", "b" and "c" respectively, as follows: a: component of sensor vector in earth X-frame; b: component of sensor vector in earth Y-frame; c: component of sensor vector in earth Z-frame).

FIG. 29 thus shows XYZ from 5 IMU's in earth frame ($1^{st}$ row=sensor 1, etc.; $1^{st}$ column=sensor X vector, $2^{nd}$ column=sensor Y vector, $3^{rd}$ column=sensor Z vector).

The sensor is mounted such that the X-axis is pointing vertical, the Z-axis in pointing in the direction of the foot and the Y-axis is completing the right-handed frame.

Therefore, the orientation of the feet is almost identical to the orientation of the Z-vector of the lower leg. The figure shows that the orientation of the left foot ($1^{st}$ row, $3^{rd}$ column) and right foot ($5^{th}$ row, $3^{rd}$ column) is different, as is expected for crab walking.

It can also be seen that the first row of the figure shows an oscillatory behaviour of the X- and the Z-vector, indicating that the step of the left leg is composed of a vertical component and a component in the direction of the foot, i.e. a 'forward' step. The last row of the figure shows an oscillatory behaviour of the X- and the Z-vector, indicating that the step of the right leg is composed of a vertical component and a component transverse to the foot, i.e. a sidewards step. This is again compliant with the crab walking motion.

45°_80 Walking

The capability of the method to find the direction of the step, is further analysed on the measurements named 45°_80.

Figure 30A:
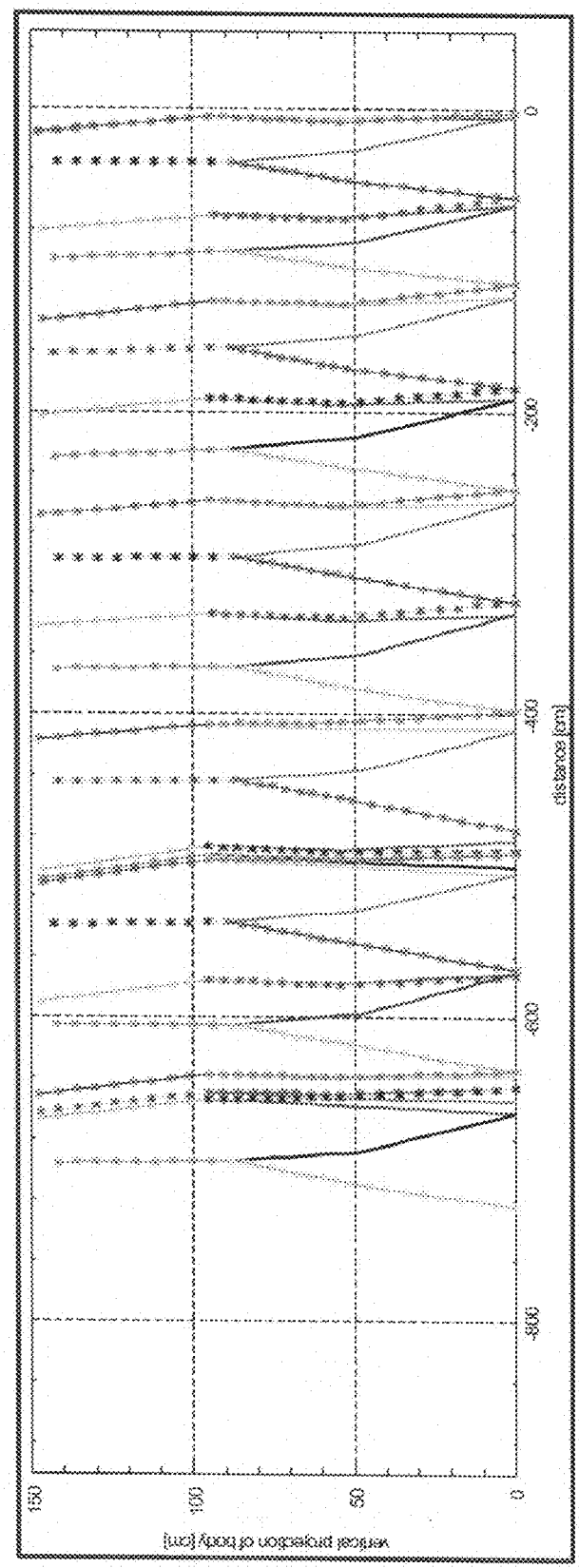
FIG. 30A shows the plots of a pedestrian projected on the XZ plane of the earth at step moments when a pedestrian is walking with the torso inclined at 45° with respect to the displacement path.
Figure 30B:
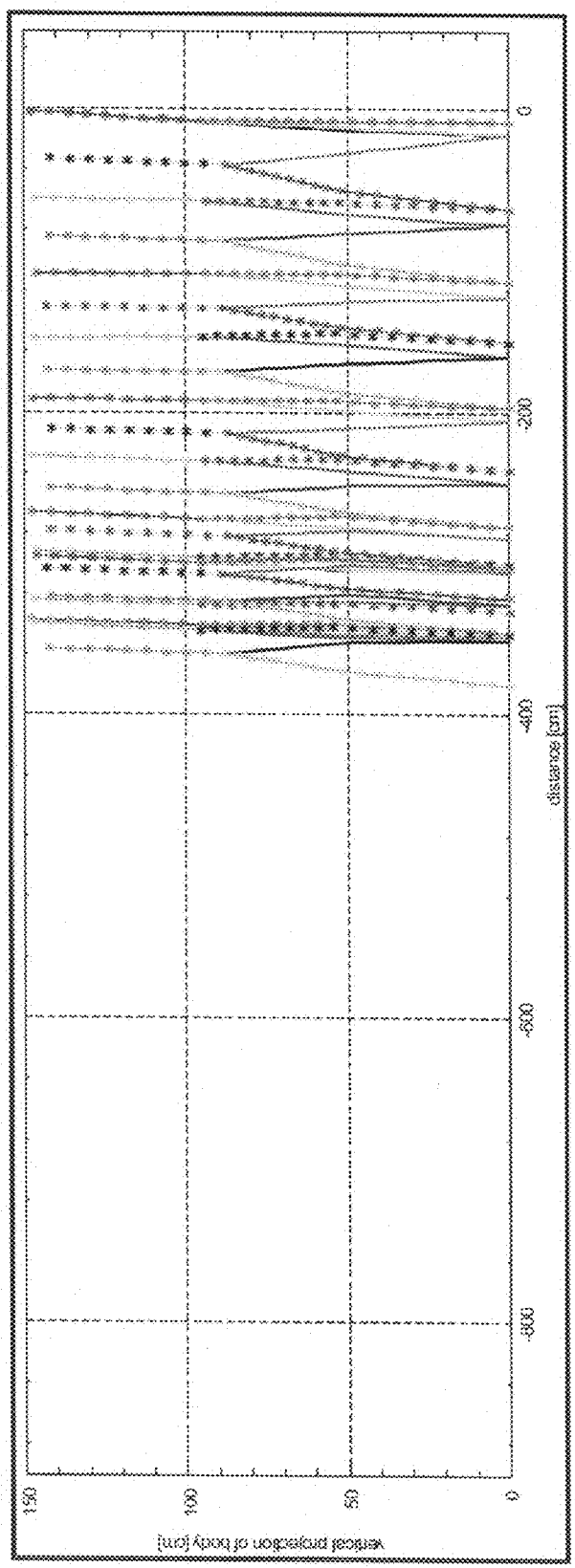
FIG. 30B shows the plots of a pedestrian projected on the YZ plane of the earth at step moments when a pedestrian is walking with the torso inclined at 45° with respect to the displacement path.
Figure 30C:
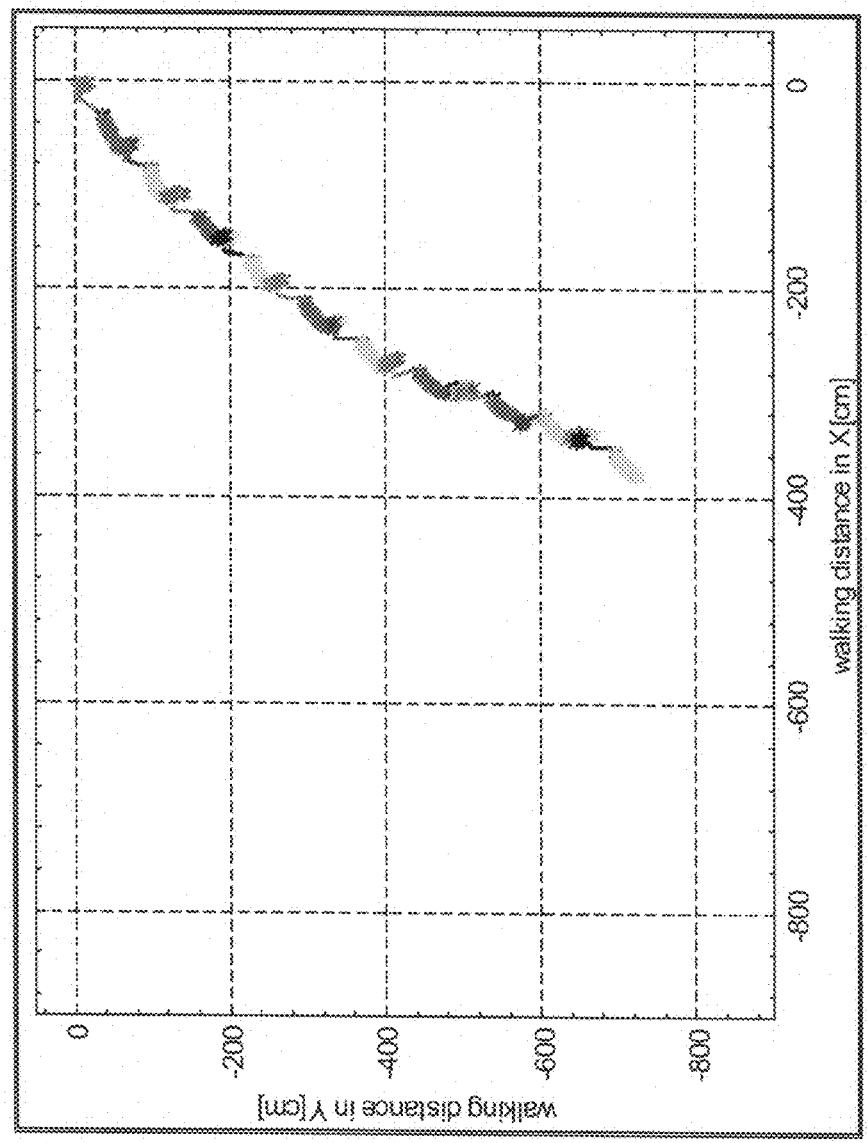
FIG. 30C shows the plots of a pedestrian projected on the XY plane of the earth at step moments when a pedestrian is walking with the torso inclined at 45° with respect to the displacement path.

FIGS. 30A, 30B and 30C are plots showing the projection of the person respectively on: the XZ-plane (FIG. 30A), the YZ-plane (FIG. 30B) and XY-plane (FIG. 30C) of the Earth at the 'step moments'.

In each of the FIGS. 30A, 30B and 30C, the abscissa indicates the distance in centimeters. In FIGS. 30A and 30B, the ordinate indicates the vertical projection of the body in centimeters. In FIG. 30C, the ordinate indicates the walking distance along the Y direction.

Figures 31A, 31B:
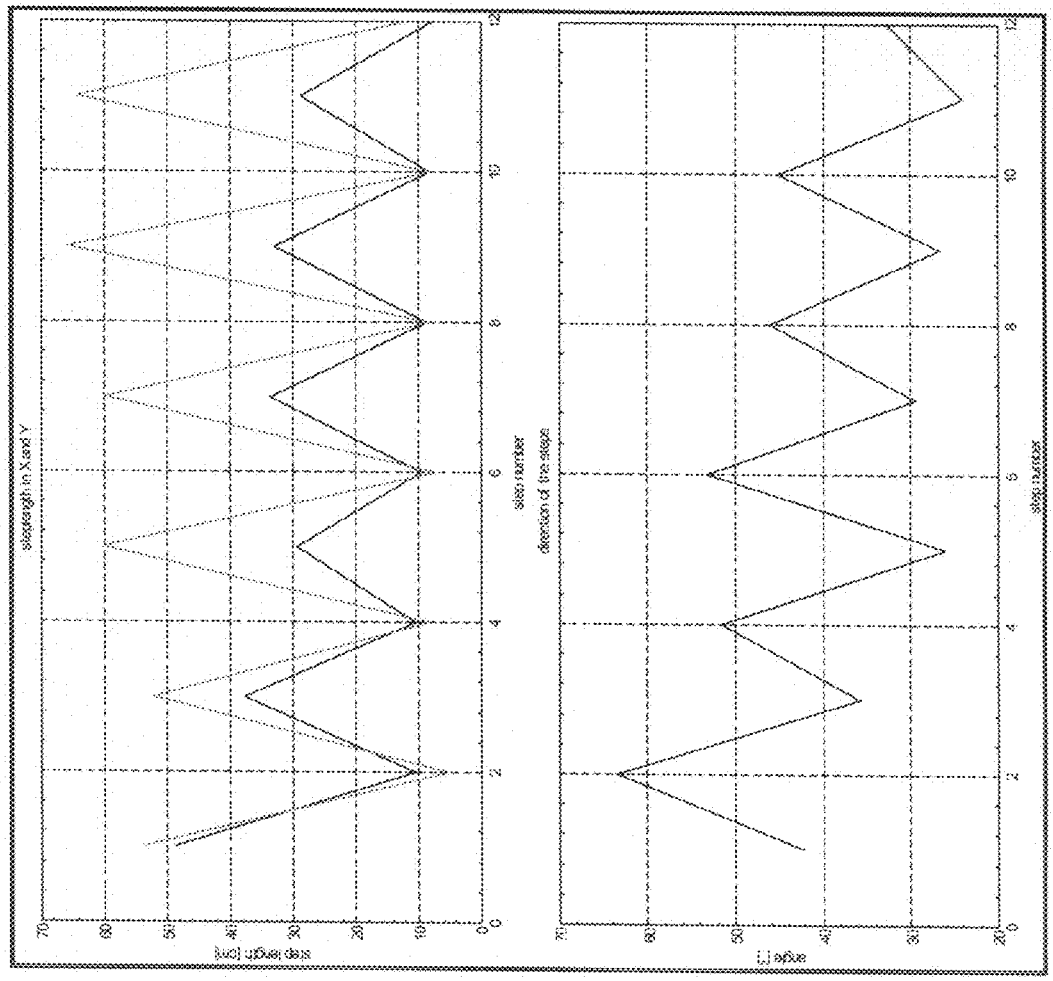
FIG. 31A is a plot showing the step distance in X and Y directions for the pedestrian motion of FIG. 30A/30B.
FIG. 31B is a plot showing the angle from the direction of the torso during calibration for the different steps.

FIG. 31A is a plot showing step length (in centimeters along an X and Y direction) against the ordinate versus a step number.

FIG. 31B is a plot showing the direction of the same steps in terms of an angle indicated along the ordinate; the step number count is the same as for FIG. 31A.

The plot of FIG. 31A shows the step distance in X and Y. The plot of FIG. 31B shows the angle from the direction of the torso during the calibration for the different steps. A step is defined by the distance between the two feet at the 'step moment'. Since the 45°_80 motion is comparable to side_left walking rather than forward walking, the plot will always show a large step followed by a small step.

The plots of FIGS. 31A and 31B show that the first steps are in a 45° direction with respect to the initial body orientation, after which the steps start to deviate from the 45°. Some effects that could explain this deviation (apart from an inherent inaccuracy of the method), are:

real deviation from the test person (which can not explain the compete error);

magnetic perturbation from the portable PC, which has changed its relative position during the manoeuvre;

magnetic perturbation from the building;

rotation of the hips or another kinematic effect from the body.

FIG. 32 illustrates the typical output and performance obtained by the preferred embodiments. The trace was obtained for a rectangular walking path, comprising four parts: a forward walk to the North, a side walk to the East, a backward walk to the South, and a side walk to the West. The total walk consisted of 45 steps and the measurements show a (non significant) difference between the start and end points of 35 cm. This gives an average deviation of less than 1 cm per step. Also, the difference between forward walking and sideward walking can be clearly seen. During forward walking, the line of sight and the step direction are in line. During sideward walking, the line of sight and the step direction for an angle of 90°.

Calibrations.

Typically, only the following two calibrations by the user will be made:

Calibration of the misalignment of the sensors on the human body segments: Person-to-track starts with standing still during few seconds in 'perfect vertical position'.

Calibration of leg segments length: Person-to-track makes some perfect 80 cm steps, allowing to measure the length of the leg segments for computation of the step size.

Forward walking seems to be in direction of North, while side-walking is under a certain angle with the north. It can be conceived that all tests have been performed in the same corridor. Therefore, it can be assumed that the north direction is heavily perturbed and almost completely determined by the portable PC, carried by the test person. In that case, the PC was carried under a certain angle with the body and the direction of walking when side-walking.

The reference sensor should preferably be placed at belt level, instead of on torso. In the actual case, an angle is given when the shoulders are rotated for example when looking forward when walking sidewards.

More information on hardware and software useful for the implementation of the above-described embodiments of the pedestrian navigation system can be found in Belgian patent document application number 2002/0099 published under the number 101 464 3A3 on 3 Feb. 2004, in the name of Verhaert Production Services, Belgium. The entire contents of that patent document are hereby incorporated by reference.

It should be clear that the PNM 34 can be coupled with this IMU-based motion detection system 32 as already mentioned in "Method for autonomous human motion pattern recognition". Both systems 32 and 34 can thus work together. Either one can also be implemented alone to constitute an independent system.

It will be appreciated that the invention lends itself to many variants and equivalents without departing from the scope of protection and the spirit of the invention.

The invention claimed is:

1. Method of determining motion of a pedestrian, comprising:
   determining at least one position of at least each foot or lower leg portion of each leg of the pedestrian,
   projecting said positions on at least one plane, whereby the projected positions express a distance between said feet or lower legportions along said at least one plane,
   detecting a situation in which said pedestrian has completed a step, and
   deriving the motion from the positions projected on said at least one plane for a situation where said pedestrian has completed the step, thereby obtaining a step length, or extent of displacement, along said at least one plane.

2. Method according to claim 1, wherein said at least one position is determined as a three-dimensional position of each said foot or lower leg portion of the pedestrian.

3. Method according to claim 1, wherein said determining comprises producing a vector in three-dimensional space of a line between respective feet or lower leg portions of said pedestrian, and wherein said projecting comprises projecting said three-dimensional vector as a two-dimensional vector onto said at least one plane.

4. Method according to claim 1, wherein said projecting comprises projecting a three-dimensional vector on at least one plane using goniometric mathematics, to produce a two-dimensional projection vector onto said at least one plane.

5. Method according to claim 1, wherein said projecting comprises producing a two-dimensional vector on said plane, and further comprises projecting said two-dimensional vector to one dimension along a line corresponding to a determined direction.

6. Method according to claim 5, wherein said line corresponds to a line of current azimuth of said pedestrian, or direction of general displacement of said pedestrian, or of averaged step direction.

7. Method according to claim 1, wherein said determining comprises determining the position of each foot of said pedestrian.

8. Method according to claim 1, wherein at least one said plane is a plane containing at least one axis corresponding to an axis of a reference coordinate system on which said motion is to be expressed, or is a plane having a component along said axis of a reference coordinate system on which said motion is to be expressed.

9. Method according to claim 1, wherein said at least one plane comprises a ground, or horizontal, plane containing North-South and West-East axes.

10. Method according to claim 1, wherein at least one said plane is a vertical plane, or a plane having a vertical component.

11. Method according to claim 1, wherein said motion to be determined is a displacement of said pedestrian in three dimensions, and wherein said projecting comprises projecting said positions on at least a first plane on which first and second dimensions of said three dimensions can be expressed, corresponding to North-South and West-East directions, and on a second plane on which the third of said three dimensions can be expressed, corresponding to a vertical direction.

12. Method according to claim 1, wherein said derived motion is at least one of: i) a step direction, ii) a distance traveled by said pedestrian along the step direction, iii) a displacement in a two dimensional reference system, or iv) a displacement in a three dimensional reference system.

13. Method according to claim 1, further comprising:
   determining a direction line of azimuth of said pedestrian, or line of average direction of steps made by the pedestrian,
   deriving, from said determining and projecting individual step vectors, and
   projecting said individual step vectors on said determined direction.

14. Method according to claim 1, wherein said at least one position of at least each foot or lower leg portion of the pedestrian is determined by a sensor worn by said pedestrian and adapted to deliver data in respect of at least one of:
   quaternion calculation,
   calculation of limb orientation;
   calculation of joint position;
   step detection;
   step orientation calculation;
   step length calculation;
   pattern recognition.

15. Method according to claim 1, wherein data for said determining is acquired by a sensor worn by said pedestrian on:
   upper leg portions of each leg, and
   lower leg portions of each leg.

16. Method according to claim 15, wherein said determining step comprises determining relative positions of identified upper and lower leg positions for each leg of said pedestrian.

17. Method according to claim 1, wherein said determining comprises determining a distance between two lower leg portions and/or two feet of said pedestrian.

18. Method according to claim 1, wherein said determining further comprises determining an identified position at a lower back, waist or trunk portion of said pedestrian.

19. The method according to claim 1, further comprising establishing a situation in which said pedestrian has completed a step movement on the basis of at least one criterion among:
   a measurement of a three-dimensional position of each foot of said pedestrian,
   a measurement of distance between feet of said pedestrian,
   detection of a situation in which at least one foot of said pedestrian is in a state of no acceleration,
   shock measurements,
   and of carrying out said projecting and/or said deriving as a function of establishing a completed step movement.

20. The method according to claim 1, further comprising establishing a situation in which said pedestrian has completed a step on the basis of a separation between two feet of said pedestrian, by:
   determining a substantially vertical component of said separation, and
   the occurrence or crossing of a substantially zero value of said substantially vertical component.

21. Method according to claim 1, further comprising establishing a situation in which said pedestrian has completed a step movement on the basis of a point of maximum horizontal distance between feet of said pedestrian, by:
   obtaining a distance measurement between two feet, and
   identifying a completed step movement as the occurrence of a maximum value in said distance measurement,
   and of carrying out said projecting and/or said deriving as a function of establishing a completed step movement.

22. The method according to claim 1, further comprising implementing an autonomous human motion pattern recognition algorithm, with a database of minimum and maximum values for at least one parameter used in said pattern and/or a model used in conjunction with said pattern.

23. Method according to claim 1, comprising implementing a minimal trimmed three-dimensional ergonomic model containing at least one critical parameter based on three-dimensional joint positions and limb orientation.

24. Method according to claim 1, comprising applying weighting coefficients to identified parameters for each of several human motion patterns based on at least one dynamic characteristic and/or at least one boundary condition of the human motion patterns, whereby a score for each pattern is calculated for each step made by said pedestrian based on the weighted parameters, the highest score being the pattern selected by a pattern recognition algorithm.

25. Method according to claim 1, further comprising a calibration phase for a sensor or sensor signal processor carried by said pedestrian, including providing positional references by:
having the pedestrian oriented at a determined azimuth, and
having the pedestrian standing still in that orientation for a determined period of time.

26. Method according to claim 1, further comprising equipping said pedestrian with a set of sensors at selected body portions, each sensor being capable of delivering a respective quaternion, said method further comprising:
converting said quaternions into a rotation matrix,
calculating a sensor alignment matrix, and
deriving at least one of:
pattern recognition,
a step distance, and
orientation,
on the basis of said rotation matrix and/or said sensor alignment matrix.

27. Method according to claim 1, comprising deriving real navigation azimuth of said pedestrian, comprising:
placing a first sensor on the pedestrian, to derive an absolute orientation azimuth of said pedestrian,
placing a plurality of second sensors on selected body portions to determine relative azimuth of said body portions, and
combining the data from said first and second sensors to produce a real navigation azimuth.

28. Method according to claim 27, wherein data from said second sensors is used to determine a step direction of said pedestrian, said combining step comprising adding the determined step direction to the orientation azimuth to obtain a real navigation azimuth along the step direction.

29. Method according to claim 1, wherein said derived motion comprises pedestrian navigation information based step length data, said method further comprising:
operating an autonomous pedestrian navigation apparatus operating by dead reckoning, said autonomous pedestrian navigation apparatus being worn by said pedestrian and capable of delivering displacement information, including distance traveled and/or trajectory,
using one or more sensors worn by said pedestrian to determine from body positions a detected step length data,
providing said step length data as input to said autonomous pedestrian navigation, and
optimizing the accuracy of the displacement information of said autonomous pedestrian navigation apparatus on the basis of said inputted detected step length.

30. Method according to claim 29, further comprising:
deriving from said one or more sensors relative azimuth data relative to a determined orientation of said pedestrian, and
providing said relative azimuth data as data input to said autonomous pedestrian navigation apparatus.

31. Method according to claim 29, wherein said autonomous pedestrian navigation apparatus is provided with internal means for determining step length on the basis of step model data and algorithms,
and wherein said step length data from said one or more sensors is used by said autonomous pedestrian navigation apparatus instead of relying on said internal means for determining step length.

32. A computer readable medium containing a program executable by processor means to perform the method according to claim 1.

33. Method of determining the motion of a pedestrian, comprising:
detecting a situation where said pedestrian has completed a step,
determining a relative separation between each foot or lower leg portion of the pedestrian, and
deriving from said relative separation a projection on at least one plane over which said pedestrian evolves or over a plane having a component along a direction over which said pedestrian evolves, the projection expressing a distance between said feet or lower leg portions of said pedestrian when the pedestrian has completed the step to obtain a step length along the at least one plane.

34. Apparatus for determining motion of a pedestrian, comprising:
means for determining at least one position of at least each foot or lower leg portion of each leg of the pedestrian,
means for projecting said positions on at least one plane whereby the projected positions express a distance between said feet or lower leg portions along said at least one plane,
means for detecting a situation in which said pedestrian has completed a step, and
means for deriving the motion from the positions projected on said at least one plane for a situation where said pedestrian has completed the step, thereby obtaining a step length, or extent of displacement, along said at least one plane.

35. Apparatus according to claim 34, adapted for deriving real navigation azimuth of said pedestrian, comprising:
first sensor means adapted to be worn above legs of the pedestrian, to derive an absolute orientation azimuth of said pedestrian,
a plurality of second sensor means on selected body portions to determine relative azimuth of said body portions, and
means for combining the data from said first and second sensor means to produce a real navigation azimuth.

36. Apparatus according to claim 35, further comprising:
means responsive to data from said second sensor means to determine a step direction of said pedestrian,
wherein said combining means comprises means for adding the determined step direction to the orientation azimuth to obtain a real navigation azimuth along the step direction.

37. Apparatus according to claim 34, wherein said determined motion comprises pedestrian navigation information based step length data, said apparatus further comprising:
an autonomous pedestrian navigation apparatus operating by dead reckoning, said autonomous pedestrian navigation apparatus being adapted to be worn by said pedestrian and being capable of delivering displacement information, including distance traveled and/or trajectory, sensor means adapted to be worn by said pedestrian to determine from body positions a detected step length data, means for inputting said step length data as input to said autonomous pedestrian navigation, and means for optimizing the accuracy of the displacement information of said autonomous pedestrian navigation apparatus on the basis of said inputted detected step length.

38. Apparatus according to claim 37, further comprising:

means for deriving from said sensor means relative azimuth data relative to a determined orientation of said pedestrian, and means for inputting said relative azimuth data to said autonomous pedestrian navigation apparatus.

39. Apparatus for determining the motion of a pedestrian, comprising:

means for detecting a situation where said pedestrian has completed a step, means for determining a relative separation between each foot or lower leg portion of each leg of the pedestrian, and means for deriving from said relative separation a projection on at least one plane over which said pedestrian evolves or having a component along a direction over which said pedestrian evolves, the projection expressing a distance between said feet or lower leg portions when said pedestrian has completed the step to obtain a step length along the at least one plane.

* * * * *